US010481702B2

(12) United States Patent
Hirose et al.

(10) Patent No.: US 10,481,702 B2
(45) Date of Patent: Nov. 19, 2019

(54) INPUT DEVICE, INFORMATION PROCESSING APPARATUS AND MANUFACTURING METHOD OF INPUT DEVICE

(71) Applicant: NINTENDO CO., LTD., Kyoto (JP)

(72) Inventors: Shinji Hirose, Kyoto (JP); Kumpei Fujita, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/945,008

(22) Filed: Apr. 4, 2018

(65) Prior Publication Data

US 2018/0299967 A1 Oct. 18, 2018

(30) Foreign Application Priority Data

Apr. 17, 2017 (JP) ................................ 2017-081361

(51) Int. Cl.
*G06F 3/02* (2006.01)
*G06F 3/041* (2006.01)
(Continued)

(52) U.S. Cl.
CPC .......... *G06F 3/0202* (2013.01); *A63F 13/214* (2014.09); *A63F 13/24* (2014.09); *A63F 13/92* (2014.09); *G06F 3/0338* (2013.01); *G06F 3/041* (2013.01); *G02F 1/13336* (2013.01); *G02F 1/13338* (2013.01)

(58) Field of Classification Search
USPC ......................................................... 345/173
See application file for complete search history.

(56) References Cited

U.S. PATENT DOCUMENTS

2013/0100021 A1 4/2013 Larsen et al.
2014/0154002 A1* 6/2014 Fujita .................... G06F 3/0338
403/345

(Continued)

FOREIGN PATENT DOCUMENTS

| EP | 0 685 817 A1 | 12/1995 |
|---|---|---|
| JP | 2014-112303 | 6/2014 |
| JP | 2014-153968 | 8/2014 |

OTHER PUBLICATIONS

Extended European Search Report dated Jun. 4, 2018 issued in European Application No. 18167629.7 (8 pgs.).

*Primary Examiner* — Jennifer Mehmood
*Assistant Examiner* — Ngan T Pham Lu
(74) *Attorney, Agent, or Firm* — Nixon & Vanderhye, P.C.

(57) ABSTRACT

A non-limiting example information processing apparatus may be a game apparatus that includes an upper housing and a lower housing. The upper housing is provided with a first LCD. The lower housing is provided with a second LCD, and a cross button is provided in a left side of the second LCD and push buttons and a pointing stick are provided in a right side of the second LCD. The pointing stick is constituted with a cap, a holder, an operating body and a sensor board. The operating body to which the sensor board is adhesively fixed is secured, in a plane, to the holder, and the cap is joined to an operating stick of the operating body with the holder interposed therebetween. Then, the holder is fixed, in a linear manner, to the lower housing at one side, and a movement toward a rear side is regulated at a side not fixed to the lower housing.

27 Claims, 13 Drawing Sheets

(51) Int. Cl.
*G06F 3/0338* (2013.01)
*A63F 13/214* (2014.01)
*A63F 13/24* (2014.01)
*A63F 13/92* (2014.01)
*G02F 1/1333* (2006.01)

(56) References Cited

U.S. PATENT DOCUMENTS

2014/0225830 A1    8/2014  Tamura et al.
2015/0212589 A1*   7/2015  Hatanaka .............. G06F 3/0414
                                               345/173
2016/0059122 A1*   3/2016  Ehara .................. A63F 13/2145
                                               463/31

* cited by examiner

FIG. 11
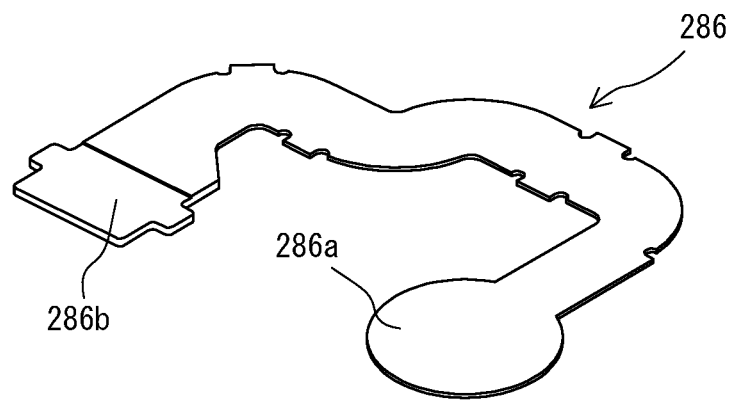
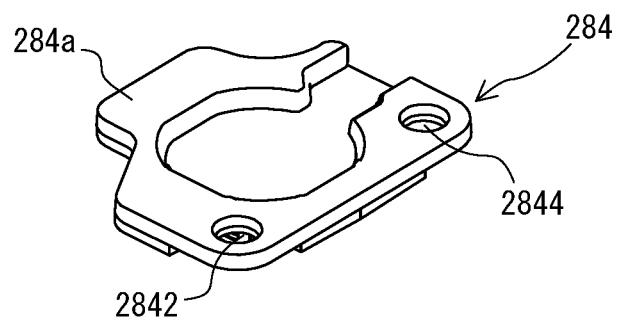
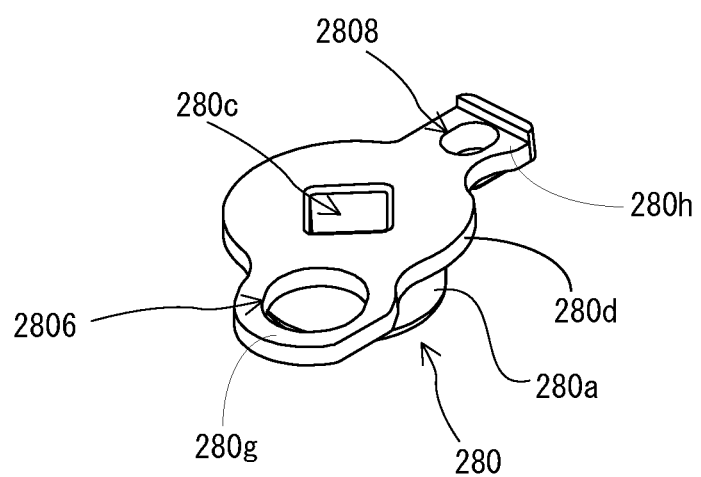

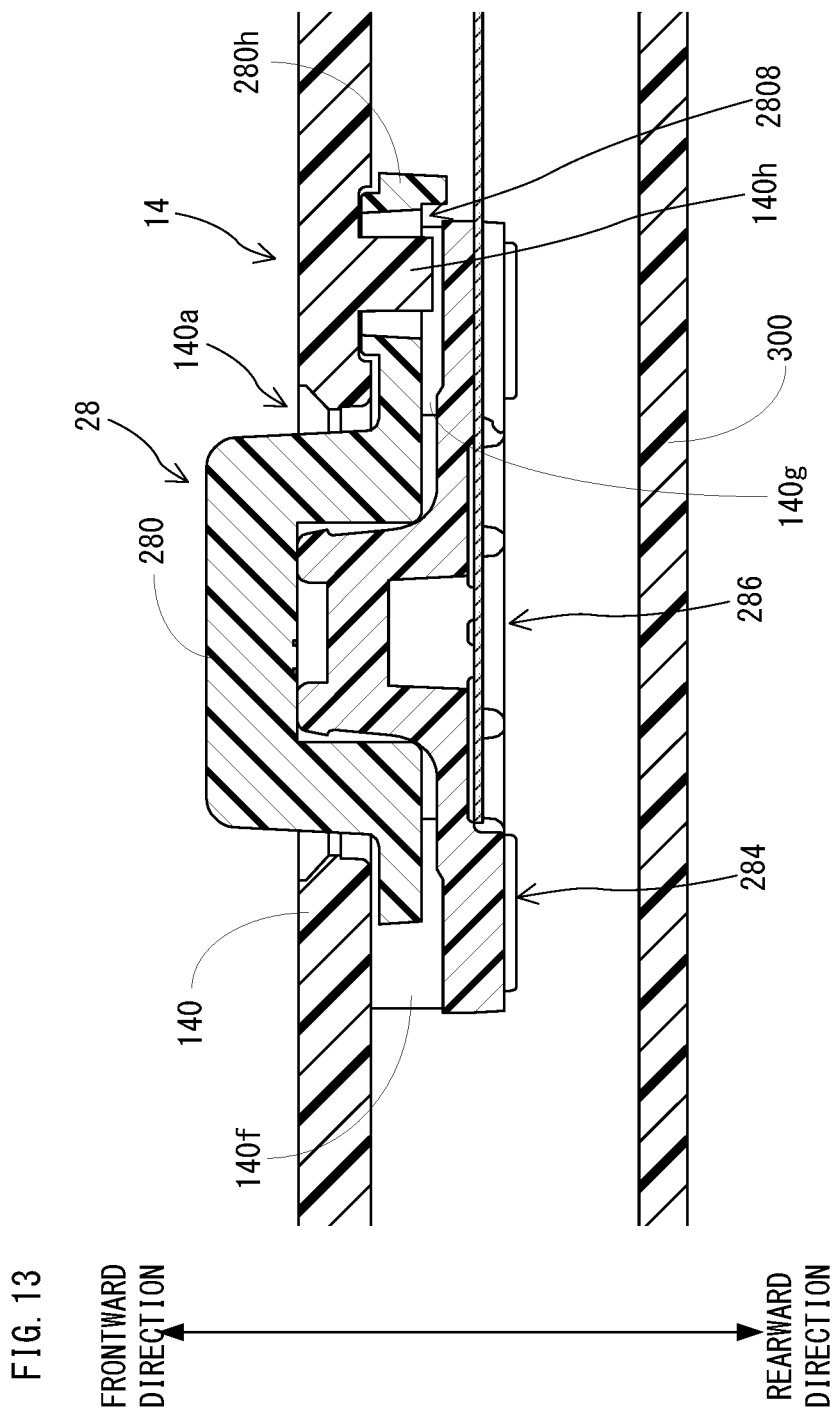

INPUT DEVICE, INFORMATION PROCESSING APPARATUS AND MANUFACTURING METHOD OF INPUT DEVICE

CROSS REFERENCE OF RELATED APPLICATION

The disclosure of Japanese patent application No. 2017-81361 filed on Apr. 17, 2017 is incorporated by reference.

FIELD

This application describes an input device, an information processing apparatus and a manufacturing method of input device, detecting an input according to an operation to a contact portion.

SUMMARY

It is a primary object of an embodiment(s) to provide a novel input device, information processing apparatus and manufacturing method of input device.

Moreover, it is another object of the embodiment(s) to provide an input device, information processing apparatus and manufacturing method of input device, capable of reducing possibility that a signal is erroneously detected.

A first embodiment is an input device, comprising: a housing, a contact portion, and an input detecting portion. The contact portion is exposed, in at least a part, from the housing. The input detecting portion is configured to detect an input according to an operation to the contact portion. The input detecting portion is fixed in a linear manner or in a point manner to the housing.

A second embodiment is the input device according to the first embodiment, further comprising a holding portion. The holding portion is arranged between the housing and the input detecting portion to hold the input detecting portion. The holding portion is fixed to the housing.

A third embodiment is the input device according to the first embodiment, wherein the input detecting portion is configured to detect a distortion according to an operation to the contact portion.

A fourth embodiment is the input device according to the second embodiment, wherein the holding portion is fixed in a linear manner to the housing.

A fifth embodiment is the input device according to the fourth embodiment, wherein the holding portion is fixed in a linear manner to the housing at one side or two adjacent sides. In also such a case, the holding portion is movable in a portion not being fixed.

A sixth embodiment is the input device according to the fourth embodiment, wherein the holding portion is fixed to the housing at two fixing portions.

A seventh embodiment is the input device according to the third embodiment, wherein the holding portion is fixed to the housing at a single fixing portion.

An eighth embodiment is the input device according to the second embodiment, wherein the contact portion is formed of an elastic member and includes a portion that is fixed in the housing with being sandwiched between the input detecting portion and the holding portion.

A ninth embodiment is the input device according to the third embodiment, further comprising a regulating member that regulates a side not fixed to the housing of the holding portion from being displaced due to an operation to the contact portion within a predetermined range.

A tenth embodiment is the input device according to the ninth embodiment, wherein the regulating portion includes a support member that is extended in a direction perpendicular to a first surface of the housing in the holding portion. The support member is provided with having a gap from a further member, and is brought into contact to the further member when the holding portion is inclined due to an operation to the contact portion, thereby to support the holding portion.

An eleventh embodiment is the input device according to the ninth embodiment, wherein the regulating member includes a support member having a first portion that is extended from the housing in a direction perpendicular to a first surface of the housing and a second portion that is extended from an end of the first portion toward the holding portion. The support member is provided with having a gap between the holding portion and the second portion, and the holding portion is brought into contact to the second portion when the holding portion is inclined due to an operation to the contact portion, thereby to support the holding portion.

A twelfth embodiment is the input device according to the second embodiment, wherein a detection member including the input detecting portion is fixed to the holding portion at three or more points.

A thirteenth embodiment is the input device according to the second embodiment, wherein the holding portion is fixed to a first surface of the housing.

A fourteenth embodiment is the input device according to the second embodiment, wherein the holding portion has a protruding portion provided around the contact portion, and the protruding portion is brought into contact to the housing.

A fifteenth embodiment is the input device according to the first embodiment, wherein the contact portion is provided on a grip portion of the housing.

A sixteenth embodiment is the input device according to the first embodiment, wherein the housing further comprises a depressing input portion. The contact portion is provided close to the depressing input portion.

A seventeenth embodiment is the input device according to the sixteenth embodiment, wherein the depressing input portion is for performing a touch input.

An eighteenth embodiment is an information processing apparatus comprising the input device recited in the first embodiment.

A nineteenth embodiment is a manufacturing method of an input device comprising a housing, a contact portion that is exposed from the housing in at least a part of the contact portion, and an input detecting portion configured to detect an input according to an operation to the contact portion, comprising steps of: (a) arranging the contact portion so as to be exposed at a front side of the housing; and (b) connecting the input detecting portion to the contact portion in a manner capable of detecting an input due to an operation to the contact portion, and fixing the input detecting portion to the housing in a rear side of the housing in a linear manner or in a point manner.

A twelfth embodiment is a manufacturing method of an input device comprising a housing, a contact portion that is exposed from the housing in at least a part of the contact portion, an input detecting portion that detects an input according to an operation to the contact portion, and a holding portion that is arranged between the housing and the input detecting portion to hold the input detecting portion, comprising steps of: (a) arranging the contact portion to be exposed at a front side of the housing; (b) connecting the input detecting portion to the contact portion in a manner capable of detecting an input due to an operation to the contact portion, and fixing the input detecting portion to the holding portion; and (c) fixing the holding portion to the housing in a rear side of the housing in a linear manner or in a point manner.

The above described objects and other objects, features, aspects and advantages of the embodiment(s) will become more apparent from the following detailed description when taken in conjunction with the accompanying drawings.

BRIEF DESCRIPTION OF THE DRAWINGS

FIG. 11 is a perspective view showing a non-limiting example state where a non-limiting example pointing stick that is provided in a game apparatus according to a third embodiment is disassembled, when viewed obliquely rear.

FIG. 13 is a cross-sectional view showing a part of a non-limiting example cross-section of the game apparatus according to the third embodiment.

DETAILED DESCRIPTION OF NON-LIMITING EXAMPLE EMBODIMENTS

First Embodiment

Figure 1A:
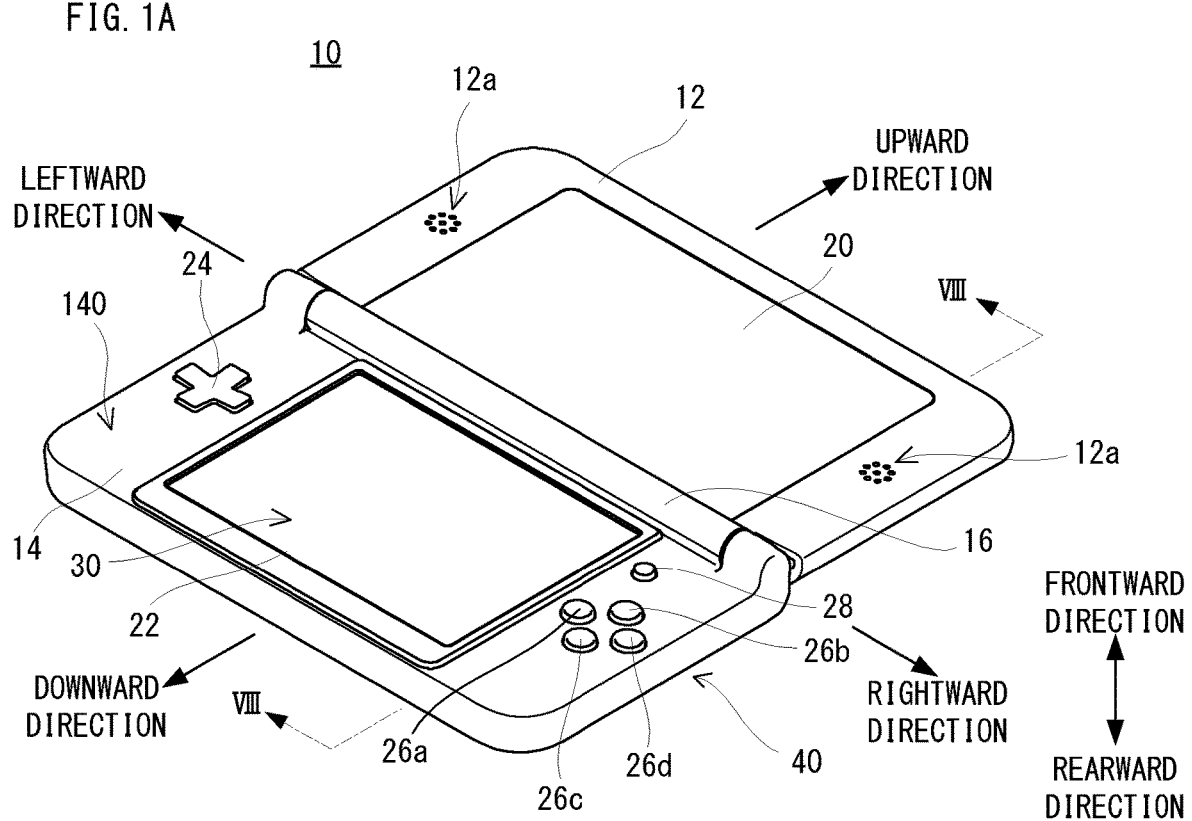
FIG. 1A is a perspective view showing a non-limiting example appearance configuration of a non-limiting example game apparatus, when viewed obliquely front.
Figure 1B:
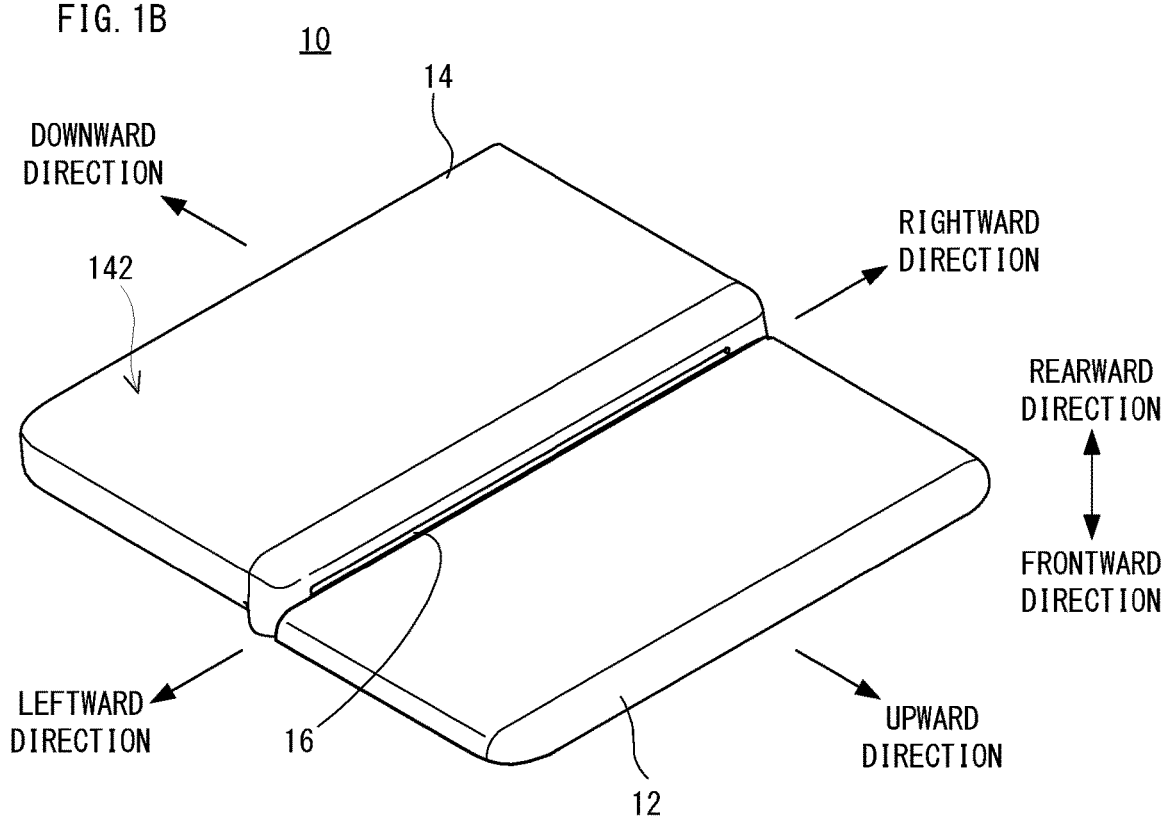
FIG. 1B is a perspective view showing the appearance configuration of the game apparatus, when viewed obliquely rear.

FIG. 1A is a perspective view showing a non-limiting example game apparatus 10 that is a non-limiting example information processing apparatus, when viewing an opened state obliquely front, and FIG. 1B is a perspective view when viewing the opened state obliquely rear.

As shown in FIG. 1A and FIG. 1B, the game apparatus 10 includes an upper housing 12 and a lower housing 14, and the upper housing 12 and the lower housing 14 are foldably or turnably coupled to each other by a hinge 16. Therefore, a main body of the game apparatus 10 is constituted by the upper housing 12, the lower housing 14 and the hinge 16.

As shown in FIG. 1A, a first LCD 20 is provided substantially at the center of the front side of the upper housing 12. Moreover, holes 12a for emitting sounds from two speakers 74 (see FIG. 3) that are provided inside the upper housing 12 are formed left and right of the first LCD on the upper housing 12.

As also shown in FIG. 1A, a second LCD 22 is provided substantially at the center of the front side of the lower housing 14. Moreover, a cross button 24 is provided at the left of the second LCD 22 on the lower housing 14. The cross button 24 comprises four push buttons (depressing input portions) of an upper, lower, left and right directions. Furthermore, on the lower housing 14, four push buttons (depressing input portions) 26a, 26b, 26c and 26d are provided at the right of the second LCD 22, and a pointing stick 28 is provided near the push buttons 26a and 26b. The cross button 24 and the push buttons 26a-26d are physical keys for physically pressing to perform an input. The pointing stick 28 comprises a cap (contact portion) 280 (see FIG. 4 etc.) for operating it by applying a force (depressing) in an arbitrary direction including upward, downward, rightward, leftward and oblique directions.

Furthermore, on the second LCD 22, a touch panel (depressing input portion) 30 of a resistance film type is provided. The touch panel 30 is for performing an input (contact input or depressing input) by a touch operation using a user's finger or a stylus pen. However, as the touch panel 30, a touch panel of other system such as an electrostatic capacitance system can also be used. Moreover, a touch screen that the second LCD 22 and the touch panel 30 are formed integrally may be used.

The game apparatus 10 of this first embodiment is a portable type apparatus (hand-held type apparatus), and is provided with an input device 40 that includes the lower housing 14, the cross button 24, the push buttons 26a-26d, the pointing stick 28 and the touch panel 30. However, the input device 40 also includes a CPU 50, a main memory 52 and a communication module 58 (see FIG. 3) described later.

In addition, the appearance configuration of the game apparatus 10 shown in FIG. 1A and FIG. 1B is an example, and should not be limited. For example, a touch panel may be provided on the first LCD 20. Moreover, the upper housing 12 and the lower housing 14 may consist of a single housing that cannot be turned (opened and close). Moreover, the number of the LCDs may be one (1), and the touch panel 30 does not need to be provided. Furthermore, the second LCD 22 may be omitted, and a touch pad may be provided instead of the touch panel 30.

It should be noted that in the following, when describing the embodiment(s) using directions, unless otherwise especially noted, upward, downward, leftward and rightward directions on the game apparatus 10 shown in FIG. 1A are used, and a direction from the front toward the rear and a direction from the rear toward the front are also used. However, the direction from the front to the rear is referred to as a rearward direction, and the direction from the rear toward the front is referred to as a frontward direction.

Figure 2:
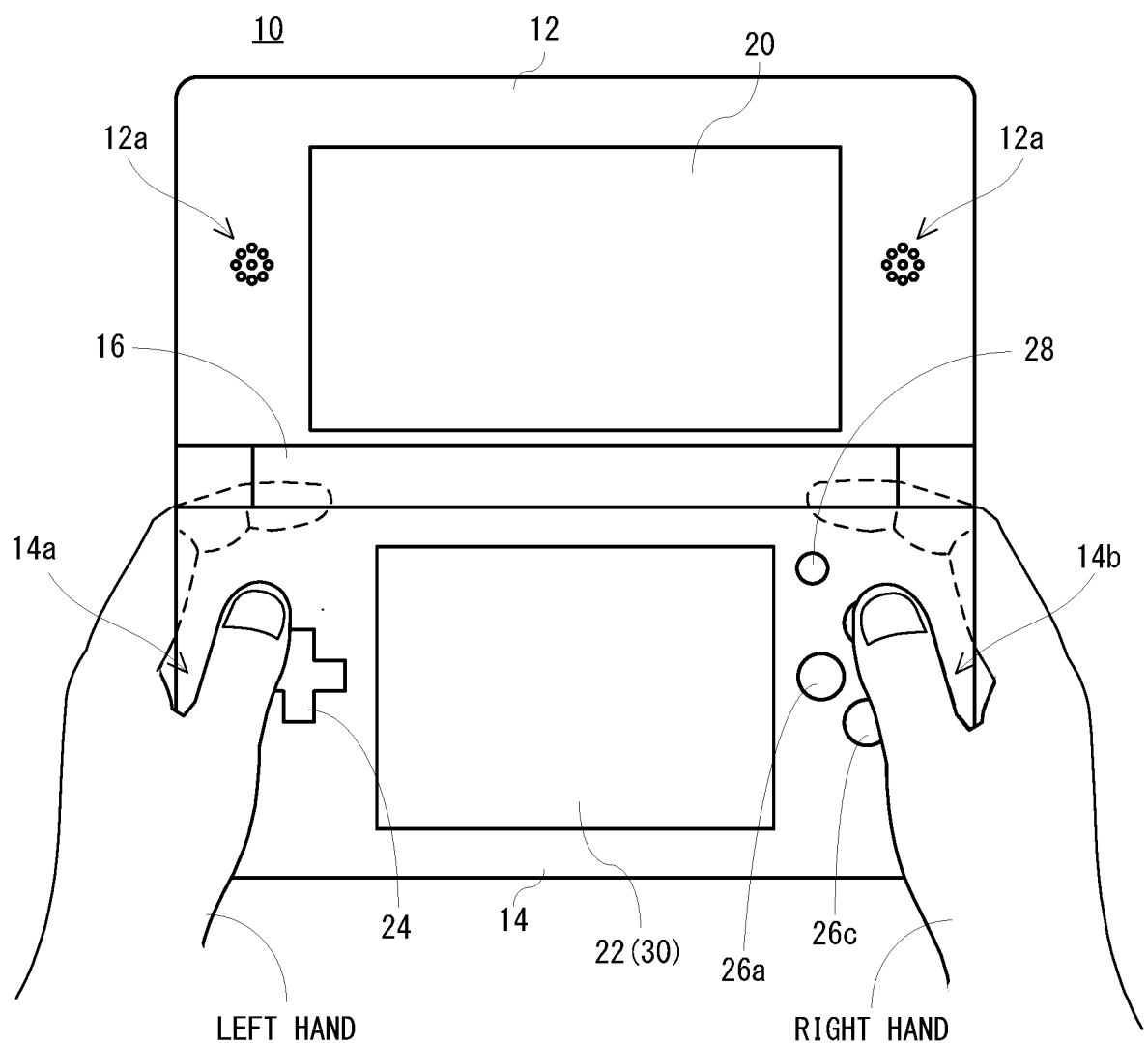
FIG. 2 is a front view showing a non-limiting example state where a user holds the game apparatus shown in FIGS. 1A and 1B.

FIG. 2 is a front view showing a non-limiting example state where a user holds the game apparatus 10 shown in FIGS. 1A and 1B, when viewed from the front.

As described above, the cross button 24, the push buttons 26a-26d and the pointing stick 28 are provided on the lower housing 14. Therefore, as shown in FIG. 2, a user holds a left side portion and a right side portion of the lower housing 14 of the game apparatus 10 with both hands so that the cross button 24 can be operated by the left thumb and the push buttons 26a-26d and the pointing stick 28 can be operated by the right thumb. Therefore, the left side portion from the second LCD 22 on the lower housing 14 can be referred to as a first holding portion 14a, and the right side portion from the second LCD 22 can be referred to as a second holding portion 14b. Thus, in the lower housing 14, the cross button 24 is provided in the first holding portion 14a, and the push buttons 26a-26d and the pointing stick 28 are provided in the second holding portion 14b. However, the user may holds the lower housing 14 by one hand to perform a touch operation the other hand.

Figure 3:
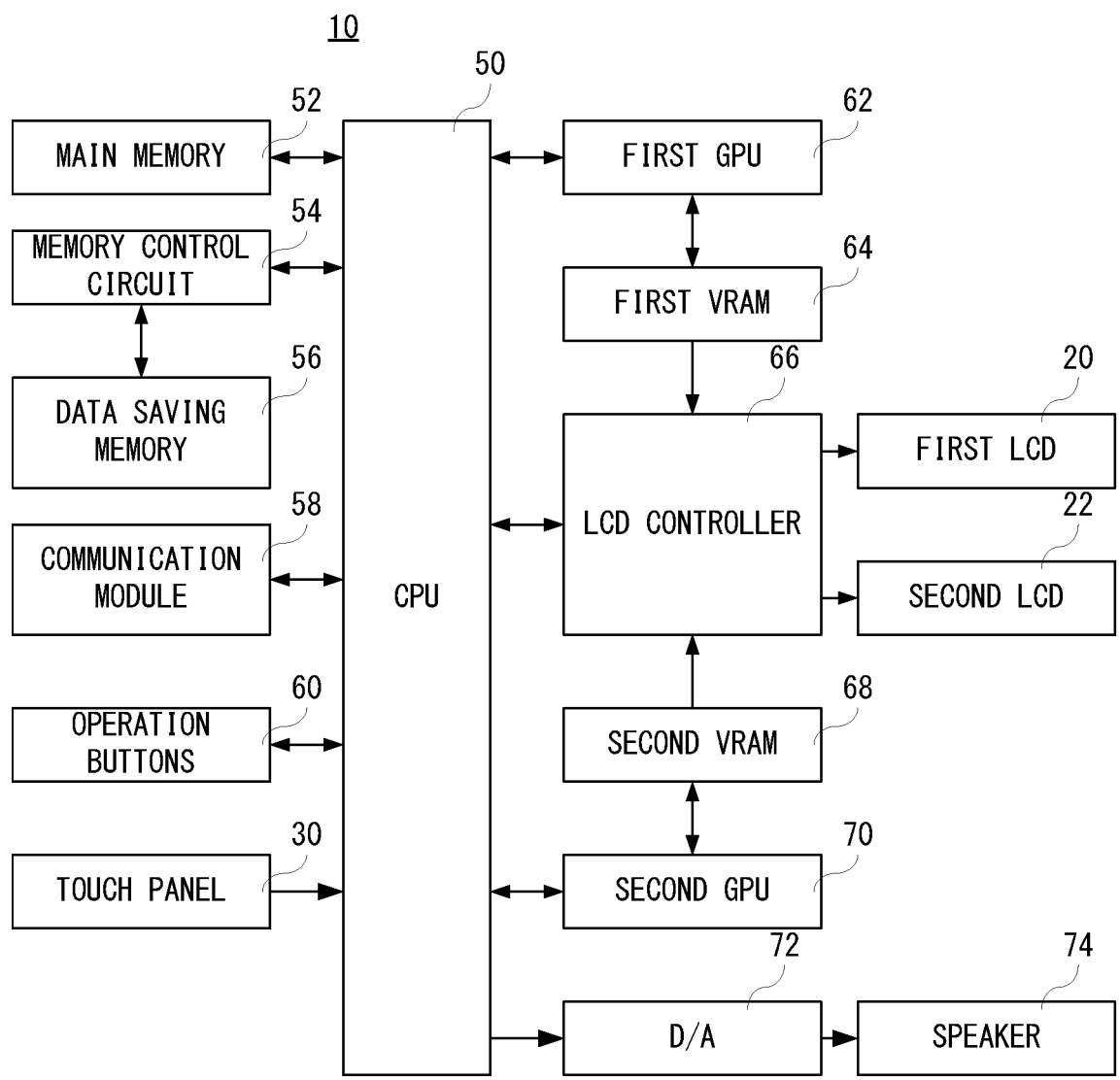
FIG. 3 is a block diagram showing a non-limiting example electric configuration of the game apparatus shown in FIGS. 1A and 1B and FIG. 2.

FIG. 3 is a block diagram showing a non-limiting example electric configuration of the game apparatus 10 shown in FIGS. 1A and 1B. As shown in FIG. 3, the game apparatus 10 includes a CPU 50, and this CPU 50 is connected with a main memory 52, a memory control circuit 54, a communication module 58, operating buttons 60, a first GPU 62, an LCD controller 66, a second GPU 70 and a digital to analog (hereinafter, called "D/A") converter 72. Moreover, a data saving memory 56 is connected to the memory control circuit 54. Furthermore, a first VRAM (Video RAM) 64 is connected between the first GPU 62 and the LCD controller 66, and a second VRAM 68 is connected between the second GPU 70 and the LCD controller 66. Furthermore, the above-described first LCD 20 and second LCD 22 are connected to the LCD controller 66.

The CPU 50 is information processing portion for executing a predetermined program(s) (application program(s)). In this first embodiment, the predetermined program(s) are stored in a memory (data saving memory 56, for example) inside the game apparatus 10, or an external memory, and the CPU 50 performs information processing through execution of the predetermined program(s).

In addition, the program to be executed by the CPU 50 may be stored in advance in the memory, or may be acquired from a memory card attachable to or detachable from the game apparatus 10, or may be acquired (downloaded) from other equipment through communication with the other equipment. Moreover, as an information storage medium that stores the predetermined program, not only a non-volatile storage medium such as the data saving memory 56 but a CD-ROM, DVD or an optical disk-like storage medium similar to them may be used.

The main memory 52 is a storing portion that is used as a working area and a buffer area for the CPU 50. More specifically, the main memory 52 stores (temporarily stores) various data to be used for the above-described information processing, and stores a program(s) acquired from exteriors (a memory card or other equipment). Operation data that is input from the operating buttons 60 or/and touch coordinates data that is input from the touch panel 30 are also included in the various data, as described later.

The data saving memory 56 is a storing portion for storing data etc. such as game data, etc. and a program(s) to be executed by the CPU 50. This data saving memory 56 is constituted by a non-volatile storage medium, and a NAND flash memory can be used for it, for example. The memory control circuit 54 controls reading and writing of data from and to the data saving memory 56 according to instructions of the CPU 50.

The communication module 58 has a function to access a wireless LAN according to the standard of IEEE802. 11. b/g, for example. Therefore, the CPU 50 transmits or receives data to or from other equipment (computers, other game apparatuses, etc.) via an access point and Internet with using the communication module 58.

However, the communication module 58 may have a function to perform short-distance wireless communication, instead of the function accessing the wireless LAN, or in a manner switchable with the function accessing the wireless LAN. When having the function of a short-distance wireless communication, the communication module 58 performs transmission/reception of an infrared signal to or from other equipment (other game apparatus etc.) with a predetermined communication system (for example, infrared system), and performs wireless-communication with the same type of game apparatus according to a predetermined communication protocol (for example, multi-link protocol). Therefore, the CPU 50 can transmit or receive data to or from the same or similar type of other game apparatus directly with using the communication module 58.

The operating buttons 60 include various operating portions such as the above-described cross button 24, push buttons 26 (26a-26d), pointing stick 28, etc. The operation data that indicates an input situation (depressed situation) with respect to each of the operating portions is output to the CPU 50 from the operating buttons 60. The CPU 50 acquires the operation data from the operating buttons 60, and performs the processing according to the acquired operation data. The touch panel 30 inputs to the CPU 50 touch coordinates data corresponding to a touch position according to a touch input (touch operation) of the user. Therefore, the CPU 50 stores the operation data that is input from the operating buttons 60 or/and the touch coordinates data that is input from the touch panel 30 to the main memory 52 according to a time series to use for processing (information processing) of various applications such as a game, music, a map, a web browser, a schedule, a timekeeper, etc.

The first GPU 62 generates, according to instructions from the CPU 50, a first display image based on data for generating a display image stored in the main memory 52, and draws the first display image in the first VRAM 64. In a similar manner, the second GPU 70 generates a second display image according to instructions from the CPU 50, and draws the second display image to the second VRAM 68.

The LCD controller 66 outputs the first display image drawn in the first VRAM 64 to the first LCD 20, and outputs the second display image drawn in second VRAM 68 to the second LCD 22.

In addition, although an LCD is used as a display device in this first embodiment, instead of the LCD, an EL (Electronic Luminescence) display, a plasma display, etc. may be used. Moreover, a display device having arbitrary resolution can be used for the game apparatus 10. Furthermore, the LCD controller 66 may output the first display image to the second LCD 22, and may output the second display image to the first LCD 20.

Moreover, the CPU 50 generates sound data about a sound (music) required in the information processing of a game etc. to output to the speaker 74 through the D/A converter 72. Although a single speaker 74 is shown in FIG. 3, as described above, two speakers 74 are provided.

Figure 4:
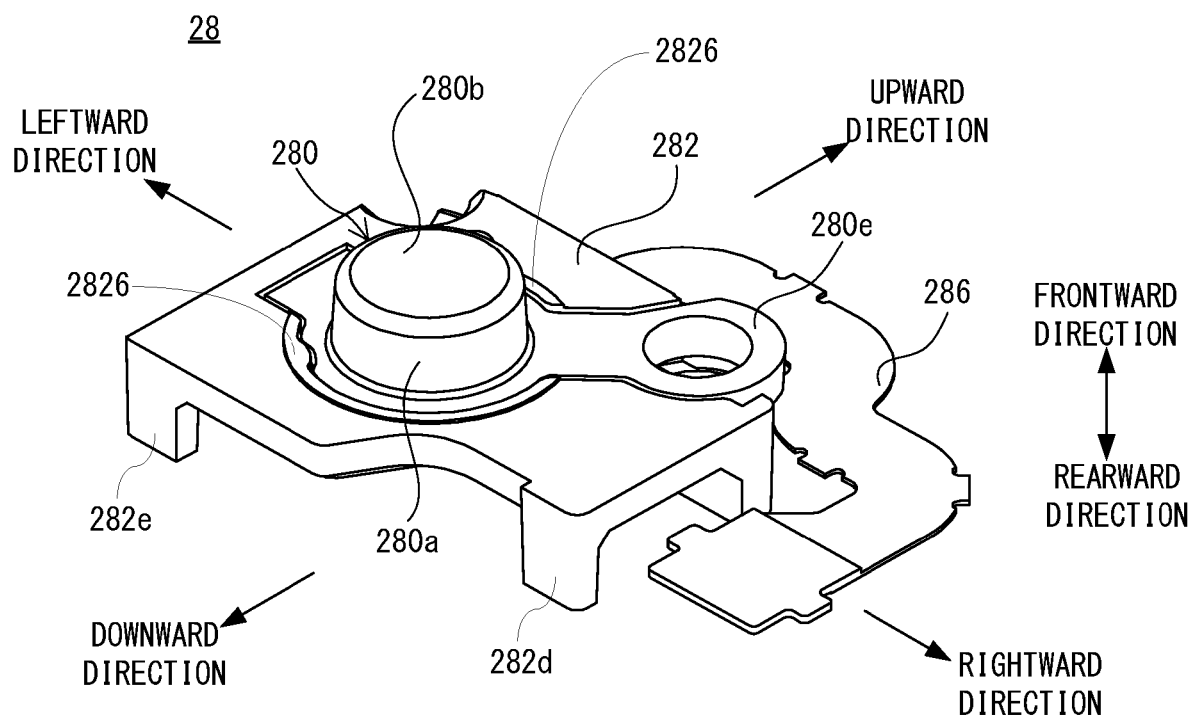
FIG. 4 is a perspective view showing a non-limiting example appearance configuration of a non-limiting example pointing stick provided in the game apparatus.
Figure 5:
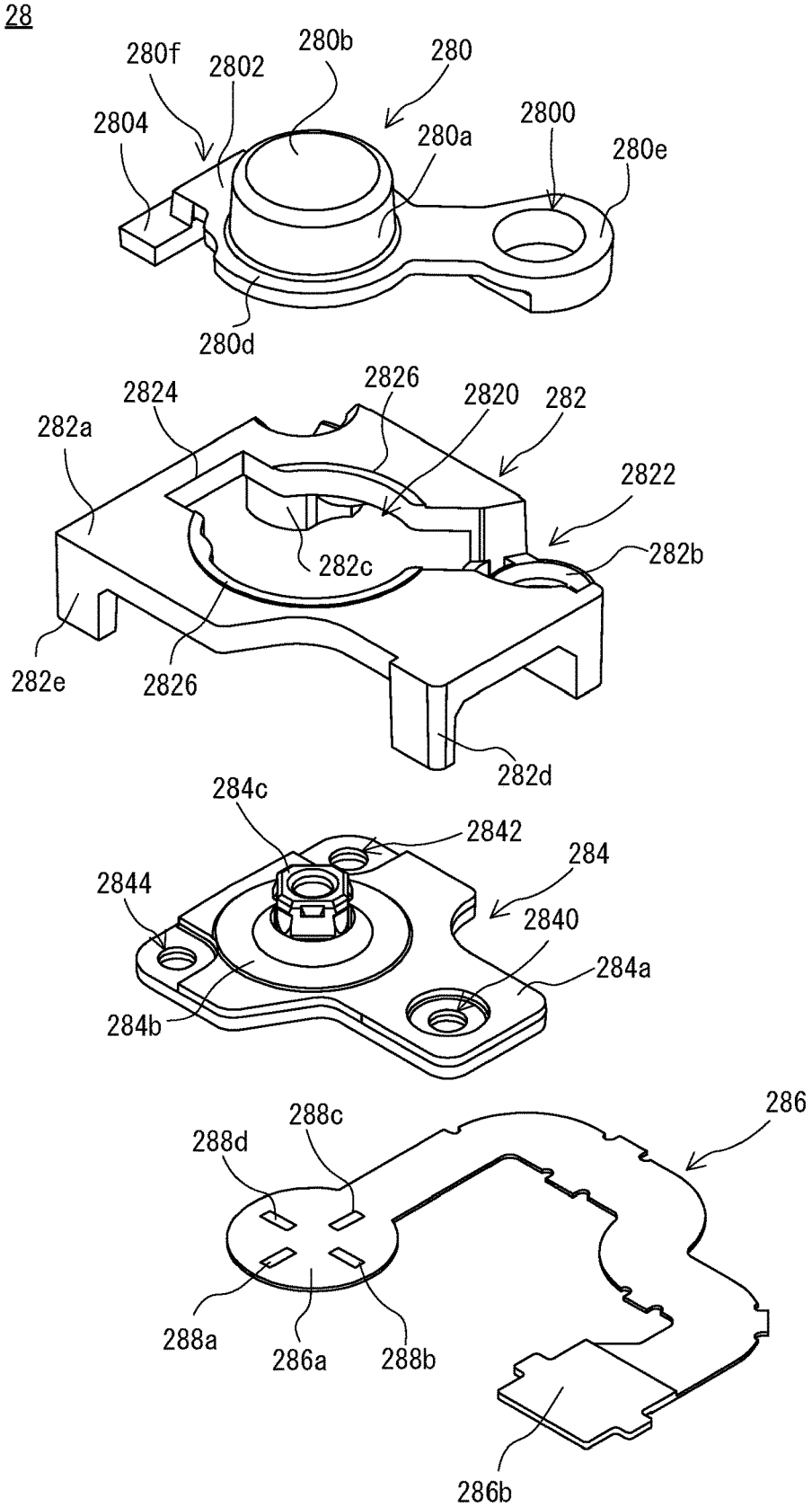
FIG. 5 is a perspective view showing a non-limiting example state where the pointing stick that is provided in the game apparatus is disassembled, when viewed obliquely front.
Figure 6:
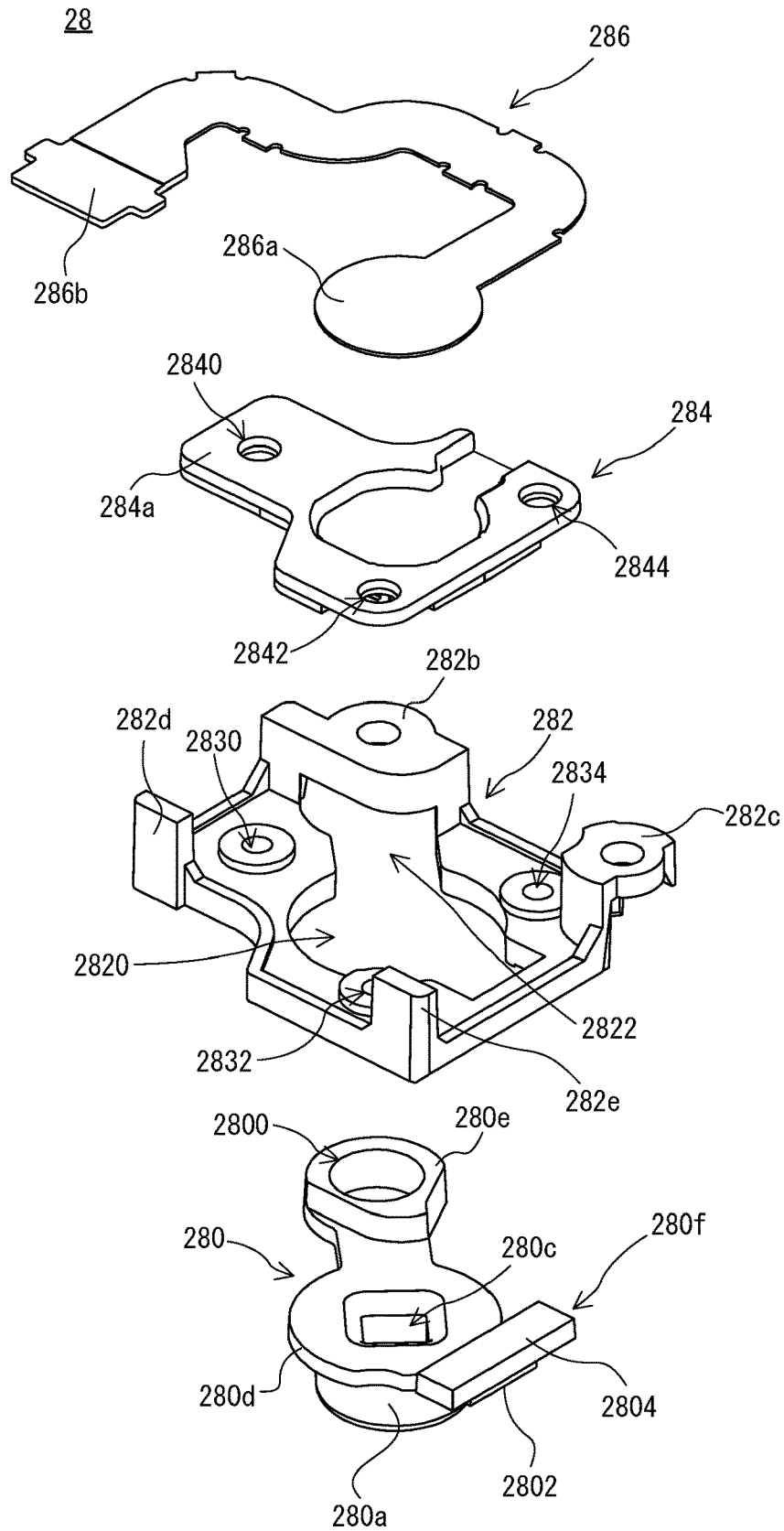
FIG. 6 is a perspective view showing a non-limiting example state where the pointing stick that is provided in the game apparatus is disassembled when viewed obliquely rear.

FIG. 4 is a perspective view showing a non-limiting pointing stick 28 that is provided in the game apparatus 10 (input device 40) of this first embodiment, when viewed obliquely front. FIG. 5 is a perspective view showing a non-limiting example state where the pointing stick 28 that is provided in the game apparatus 10 of this first embodiment is disassembled, when viewed obliquely front. FIG. 6 is a perspective view showing a non-limiting example state where the pointing stick 28 that is provided in the game apparatus 10 of this first embodiment is disassembled, when viewed obliquely rear.

As shown in FIG. 4-FIG. 6, the pointing stick 28 includes a cap 280, a holder 282, an operating body 284 and a sensor board 286. As shown in FIG. 4-FIG. 6, in the pointing stick 28, the cap 280 is arranged inside the holder 282 except for a part thereof (protruding portion 280e). As shown in FIG. 4 and FIG. 5, a projecting portion 2826 is formed so as to project in the frontward direction of the holder 282 around a portion (hole 2820) where a peripheral surface portion 280a, a top surface portion 280b and a flange portion 280d of the cap 280 are arranged. Therefore, the projecting portion 2826 that is formed on the holder 282 is arranged around a portion of the cap 280 (a part of the peripheral surface portion 280a and the top surface portion 280b), to which the user contacts.

In addition, although the pointing stick 28 includes the cap 280 in this first embodiment, it is not necessary to include the cap 280. In such a case, an operating stick 284c of the operating body 284 described later also functions as a contact portion to be operated by the user.

As an example, the cap 280 is formed of an elastic body, and includes the peripheral surface portion 280a formed in a substantially cylindrical shape. The top surface portion 280b is formed in an end portion of the front side of the peripheral surface portion 280a to blockade the front side of the peripheral surface portion 280a. An end of the rear side of the peripheral surface portion 280a is opened to form an opening portion 280c. The flange portion 280d is provided so as to protrude outward from an outer periphery edge of the opening portion 280c. A protruding portion 280f is formed so as to protrude further outward from a part of the flange portion 280d. Similarly, a protruding portion 280e is formed so as to protrude further outward from another part of the flange portion 280d. A locking portion 2800 of a ring-like shape is formed in an end portion of the protruding portion 280e. Moreover, the protruding portion 280f is constituted by an extending portion 2802 that is extended from the flange portion 280d and a locking portion 2804 that is provided in the rearward direction of the extending portion 2802. The extending portion 2802 is formed in a size the same or approximately the same as a size of a cutout portion 2824 of the holder 282 described later, and the locking portion 2804 is formed in a size larger than a size of the extending portion 2802.

In addition, the cap 280 is constituted by integrally forming the peripheral surface portion 280a (including the opening portion 280c), the top surface portion 280b, the flange portion 280d, the protruding portion 280e and the protruding portion 280f.

As an example, the holder 282 is formed by a resin such as a plastic, and includes a holder main body 282a that is formed in a shape of substantially rectangle plate when viewed from the frontward direction. The holder main body 282a is formed with a hole 2820 in a shape of substantially circle, a cutout portion 2822 (accommodating portion) that is cut-out so as to be extended radially (in a radial direction) toward a corner portion of the holder main body 282a from a part of the hole 2820, and the cutout portion (accommodating portion) 2824 that is cut-out in a shape of rectangle outwardly from another part of the hole 2820. By forming the hole 2020, the cutout portion 2822 and the cutout portion 2824, the cap 280 can be arranged in a predetermined position and predetermined direction of the holder main body 282a.

There is provided with a projecting portion 2826 that is projected in the frontward direction on a peripheral edge of the hole 2820 in the front side of the holder main body 282a. However, the projecting portion 2826 is not formed in portions that the cutout portion 2822 and the cutout portion 2824 are formed.

Moreover, the holder 282 is provided with a cylindrical member 282b that is extended in the rearward direction, and is arranged in the rear side of the holder main body 282a in a corner portion formed with the cutout portion 2822 of the holder main body 282a. Moreover, the holder 282 is provided with a further cylindrical member 282c that is extended in the rearward direction, and is arranged in the rear side of the holder main body 282a in another corner portion of the holder main body 282a. The cylindrical member 282b and the cylindrical member 282c are provided for passing a threaded portion (and a cylindrical portion) of a screw 150 (see FIG. 7B-FIG. 7D) when fixing the holder 282 to the lower housing 14.

Furthermore, the holder 282 is provided with a leg member (support member) 282d that is arranged in the rear side of the holder main body 282a in a side (lower side) opposite to a side (upper side) on which the cylindrical member 282b and the cylindrical member 282c are provided and extended in the rearward direction from another corner portion of the holder main body 282a, and a leg member 282e (support member) that is extended from a further corner portion of the holder main body 282a in the rearward direction.

Furthermore, as well shown in FIG. 6, threaded holes 2830, 2832 and 2834 for fixing the operating body 284 are formed in the rear side of the holder main body 282a.

The operating body 284 is formed of a resin or heat-resistant ceramic material, and includes a base portion 284a, a pedestal portion 284b and an operating stick 284c. The base portion 284a is formed with three holes 2840, 2842 and 2844 for each passing a threaded portion (and cylindrical portion) of a screw 152 (see FIG. 7C-FIG. 7D) when fixing this base portion 284a to the holder 282. The pedestal portion 284b is formed in a shape of substantially circular, and is provided so as to overlap with the base portion 284a in the front side. The operating stick 284c is formed in a substantially quadrangular prism shape, and provided upright in the front side of the pedestal portion 284b in a center portion of the pedestal portion 284b.

The sensor board 286 is formed by a flexible resin film etc., and includes a base end portion 286a in one end thereof. The base end portion 286a is formed in a shape of substantially circular, and is fixed to a rear surface of the operating body 284 so as to correspond to a position of the pedestal portion 284b of the operating body 284. Moreover, a connector 286b is provided in the other end of the sensor board 286. The connector 286b is to be connected to a connector (not shown) provided in an electronic circuit board 300 (see FIG. 8) in the game apparatus 10. Some components out of circuitry components shown in FIG. 3, such as the CPU 50 are provided on the electronic circuit board 300, and electrically mutually connected by metallic wires (not shown) or a cable (not shown) provided in the electronic circuit board 300. Moreover, some other components not provided in the electronic circuit board 300 are arranged in the upper housing 12 or the lower housing 14, and are electrically connected to the CPU 50 using a cable etc.

Distortion sensors 288a, 288b, 288c and 288d each consisting of a thick resistance film or thin resistance film are arranged in the base end portion 286a of the sensor board 286. The base end portion 286a on which the distortion sensors 288a-288d are arranged is adhesively fixed to the rear side of the pedestal portion 284b of the operating body 284. By adopting the above-described configuration, when the operating stick 284c is tilted by depressing the cap 280, on the distortion sensors 288a-288d provided below the operating stick 284c, a compressive force acts in a direction that the operating stick 284c is tilted and a tensile force acts in a direction opposite to the direction that the operating stick 284c is tilted. A resistance value of each of the distortion sensors 288a-288d is changed by the compressive force and the tensile force. By detecting a change in the resistance value of each of the distortion sensors 288a-288d, a direction and size that the operating stick 284c is tilted by user's operation can be detected.

As described above, the pointing stick 28 is provided in the lower housing 14. The user can operate the pointing stick 28 with a finger while looking at the first LCD 20 or/and the second LCD 22 when holding the game apparatus 10 (mainly lower housing 14) with both hands. For example, when the user operates the cap 280 upward, the operating stick 284c is tilted in the upward direction (in FIGS. 1A and 1B), and a size of a tilt in the upward direction is detected according to changing amounts of respective resistance values of the distortion sensors 288a-288d due to the tilt. The game apparatus 10 makes the objects on the screen, such as a cursor, a character or the like move in the upward direction according to the detected upward direction input (operation data).

Here, using FIG. 7A-FIG. 7D, description is made on a method and mounting structure of attaching the pointing stick 28 shown in FIG. 4-FIG. 6 to the lower housing 14. However, in FIG. 7A-FIG. 7D, only a part of the front side member 140 of the lower housing 14 is shown. Moreover, as shown in FIG. 7A-FIG. 7D, when attaching the pointing stick 28 to the lower housing 14, the cap 280, the holder 282 and the operating body 284 to which the sensor board 286 are fixed is attached from a rear side of the front side member 140. Therefore, a state viewed from the rear side is shown in each of FIG. 7A-FIG. 7D.

The front side member 140 is formed with a hole 140a (see FIG. 8), and a cylindrical member 140b and a cylindrical member 140c each having a threaded hole are formed near the hole 140a. The pointing stick 28 is attached to the lower housing 14 so that the cap 280 may be arranged in a position of the hole 140a of the lower housing 14.

Figure 7A:
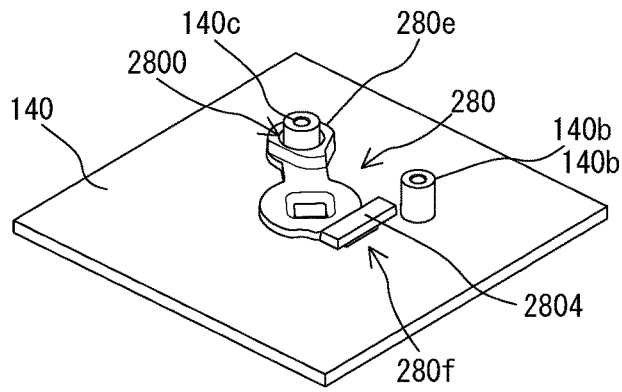
FIG. 7A is a perspective view showing a non-limiting example state where a cap is put on a front side member.

For example, as shown in FIG. 7A, the cap 280 is put on the front side member 140 so that the top surface portion 280b and a part of the peripheral surface portion 280a of the cap 280 are fit (inserted) into the hole 140a from the rear side of the front side member 140 of the lower housing 14, and the cylindrical member 140c that is provided in the rear side of the front side member 140 is fit (inserted) into the locking portion 2800.

Figure 7B:
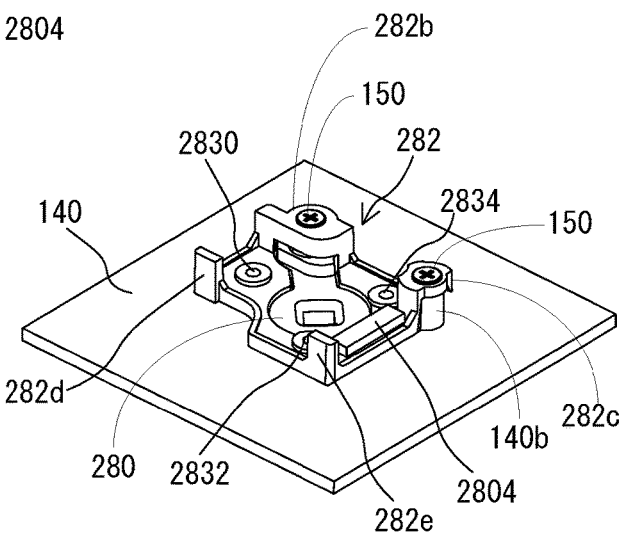
FIG. 7B is a perspective view showing a non-limiting example state where a holder is further put on in the state shown in FIG. 7A.

Next, as shown in FIG. 7B, the holder 282 is put on the cap 280 so that the peripheral surface portion 280a, the protruding portion 280e and the protruding portion 280f of the cap 280 are fit (accommodated) into the hole 2820, the cutout portion 2822 and the cutout portion 2824, respectively. At this time, the holder 282 is arranged so that the locking portion 2804 constituting the protruding portion 280f of the cap 280 is brought to the rear side of the holder 282. Then, the holder 282 is fixed to the lower housing 14 with the screw 150.

Figure 7C:
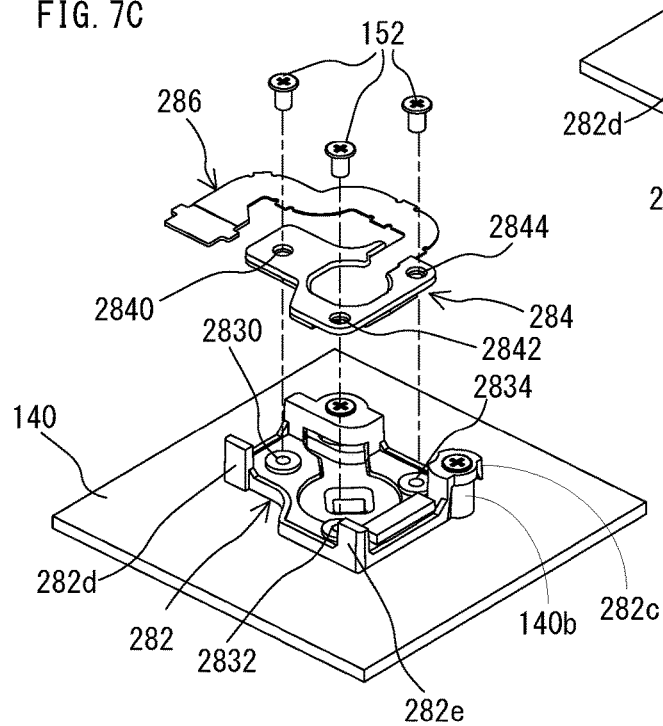
FIG. 7C is a perspective view showing a non-limiting example state where an operating body to which a sensor board is adhesively fixed is further put on in the state shown in FIG. 7B.
Figure 7D:
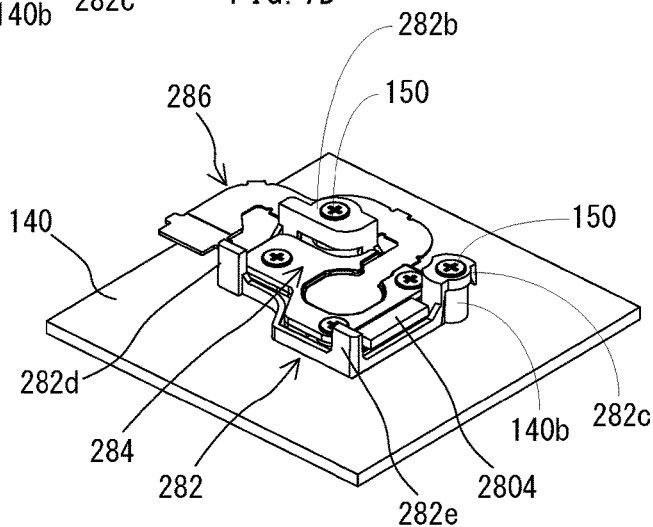
FIG. 7D is a perspective view showing a non-limiting example state where the operating body to which the sensor board is adhesively fixed is secured to the holder in the state shown in FIG. 7C.

Subsequently, as shown in FIG. 7C and FIG. 7D, the operating body 284 to which the sensor board 286 is adhered is fixed to the holder 282. In this case, the operating stick 284c shown in FIG. 5 is attached to the cap 280 from the opening portion 280c (see FIG. 8). Moreover, at this time, the direction of the operating body 284 is set in a manner that the hole 2840 is overlapped with a position of the threaded hole 2830 of the holder 282, the hole 2842 is overlapped with a position of the threaded hole 2832 of the holder 282, and the hole 2844 is overlapped with a position of the threaded hole 2834 of the holder 282. Then, as shown in FIG. 7D, the operating body 284 to which the sensor board 286 is adhered is fixed to the holder 282 with the screw 152.

In addition, a method of attaching the pointing stick 28 to the lower housing 14 does not need to be limited to the above-described method. After assembling the pointing stick 28 by fixing the cap 280 and the operating body 284 to which the sensor board 286 is adhered to the holder 282, the cap 280 may be arranged so as to correspond to a position of the hole 140a and the holder 282 may be fixed to the front side member 140 with the screw 150.

Moreover, although the operating body 284 to which the sensor board 286 is adhered is fixed to the holder 282 with the screw 152 in this first embodiment, adhesive fixation may be adopted.

As shown in FIG. 7A, the locking portion 2800 is biased toward the front side by the cylindrical member 282b through the cylindrical member 140c since the holder 282 is fixed to the front side member 140 with the screw 150. Therefore, the locking portion 2800 is not separated from the cylindrical member 140c.

Moreover, as shown in FIG. 7B-FIG. 7D, the locking portion 2804 is arranged in the rear side of the holder 282. Moreover, as shown in FIG. 7C and FIG. 7D, the extending portion 2802 between the flange portion 280d and the locking portion 2804 is sandwiched between the holder 282 (cutout portion 2824) and the operating body 284 by fixing the operating body 284 to the holder 282 with the screw 152. As described above, since the locking portion 2804 is formed larger than the cutout portion 2824, the cap 280 is hard to come-off toward the front side in a portion that the protruding portion 280f is provided.

Furthermore, the flange portion 280d is engaged with a peripheral edge portion on the rear side of the hole 140a formed in the front side member 140 of the lower housing 14.

Since the cap 280 is thus attached, the cap 280 is prevented from being separated from the operating stick 284c, and the cap 280 is prevented from coming off the holder 282.

Figure 8:
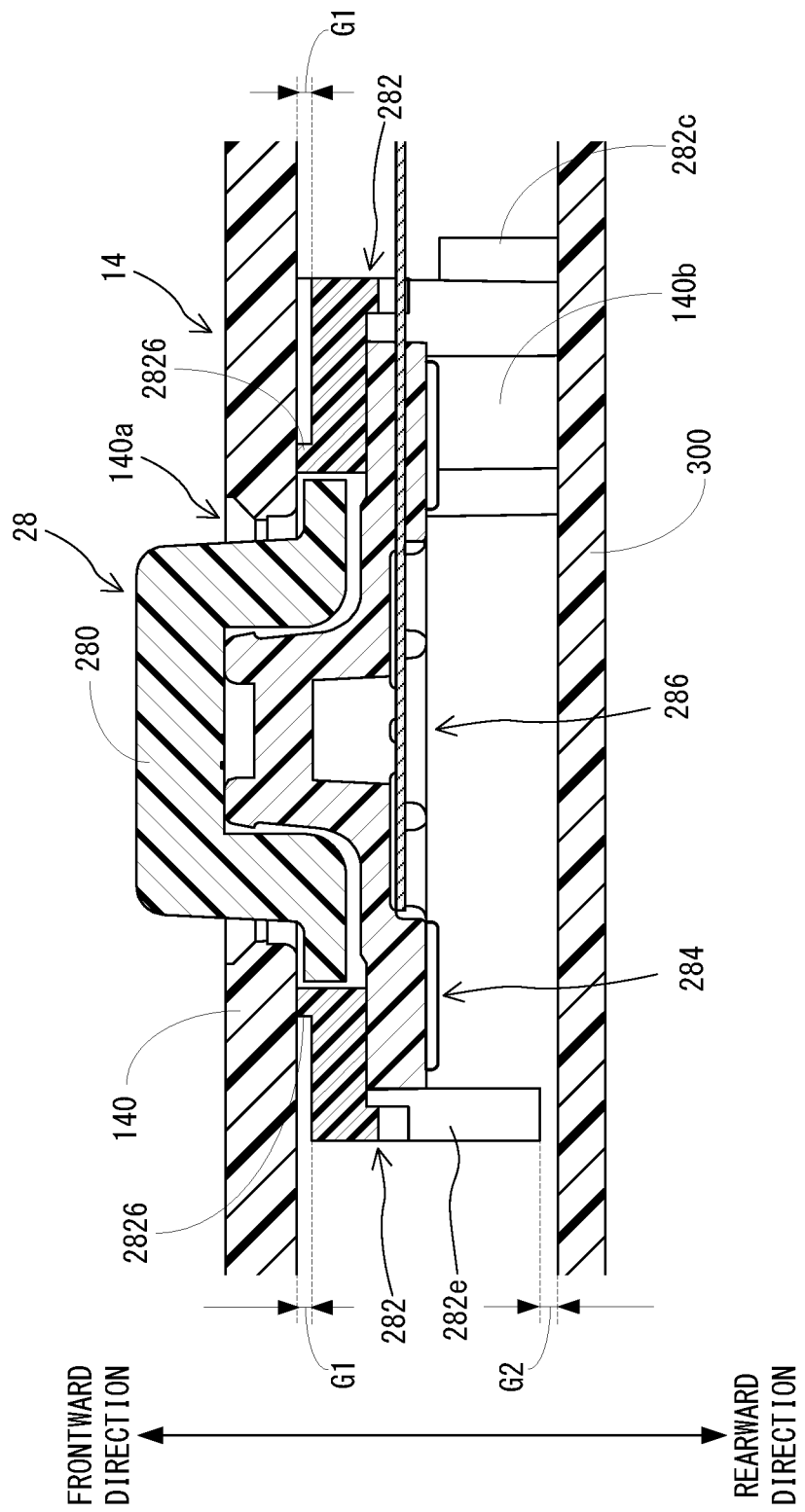
FIG. 8 is a cross-sectional view showing a part of a non-limiting example cross-section of the game apparatus shown in FIGS. 1A and 1B.

FIG. 8 is a cross-sectional view showing a part of a non-limiting example cross-section at a line VIII-VIII in FIG. 1A. Specifically, FIG. 8 shows anon-limiting example part of a portion that the pointing stick 28 is attached to the lower housing 14. However, in FIG. 8, components other than the pointing stick 28, such as the second LCD 22 arranged behind (leftward direction in FIGS. 1A and 1B) the pointing stick 28 are omitted. Moreover, components that are arranged in the rear side from a member (here, the electronic circuit board 300) that is provided in the rear side of the pointing stick 28 and a rear side member 142 constituting the lower housing 14 are also omitted.

As shown also in FIG. 8, the pointing stick 28 is arranged in the lower housing 14 in a manner that a part of the cap 280 (the top surface portion 280b and an approximately upper half of the peripheral surface portion 280a) is exposed from the front of the lower housing 14 through the hole 140a that is formed in the front side member 140 of the lower housing 14. The cap 280 is attached so as to cover the operating stick 284c of the operating body 284. However, the operating body 284 is fixed to the holder 282. Moreover, as described above, the projecting portion 282b is arranged around a portion (a part of the peripheral surface portion 280a and the top surface portion 280b) of the cap 280, to which the user contacts.

In a state where the holder 282 is attached to the lower housing 14, and the pointing stick 28 is not operated and thus the lower housing 14 is not bent (deformed), a whole of the projecting portion 282b provided in the front of the holder main body 282a is brought into contact (abutted) to the rear surface of the front side member 140. In this state, a portion or area of the front surface of the holder main body 282a not provided with the projecting portion 282b does not contact to the lower housing 14 (the front side member 140). That is, a gap G1 is formed.

Although omitted in the above description, a length from an end of the front side of the holder main body 282a to an end of the rear side of the cylindrical member 282b and the they on cylindrical member 282c is longer than a length from the end of the front side of the holder main body 282a to an end of the rear side of the leg member 282d and the leg member 282e. Therefore, in the holder 282, ends of the rear side of the cylindrical member 282b and the cylindrical member 282c contact to the electronic circuit board 300, whereby the holder 282 (pointing stick 28) can be supported by the cylindrical member 282b and the cylindrical member 282c. On the other hand, ends of the rearward direction side of the leg member 282d and the leg member 282e form a gap G2 with the electronic circuit board 300.

As described above, the holder 282 is fixed to the lower housing 14 at two points that the cylindrical member 282b and the cylindrical member 282c are provided, respectively. That is, the holder 282 is fixed to the lower housing 14, in a linear manner (like a line segment connecting the above-described two points), with one side on a side that the cylindrical member 282b and the cylindrical member 282c are provided. Moreover, the holder 282 may be further fixed at arbitrary one point or two or more points between the cylindrical member 282b and the cylindrical member 282c. However, when it can be considered that the holder 282 is fixed, in a linear manner, to the lower housing 14 the holder 282 may be fixed to the lower housing 14 at three or more points including one point or two or more points not on a straight line that connects the two points that the cylindrical member 282b and the cylindrical member 282c are provided, respectively. That is, even if a shape of a surface that is formed by connecting the fixed points is a polygonal shape such as a triangle, a shape of the surface may be an arbitrary shape such as an elongated triangle or an elongated quadrangle shape (like bar shape) as long as it does not hinder the holder 282 to turn (tilt). Moreover, as another example, the holder 282 may be adhesively fixed, in a linear manner, to the lower housing 14.

In this first embodiment, the holder 282 is supported by the cylindrical member 282b and the cylindrical member 282c, and when the pointing stick 28 (cap 280) is depressed, usually, a direction and size that the operating stick 284c is tilted due to a depressing force are detected by the distortion sensors 288a-288d.

Moreover, since the holder 282 is fixed to the front side member 140 in the portion that the cylindrical member 282b and the cylindrical member 282c are provided, when the pointing stick 28 is depressed by an unnecessarily strong force, a side (lower side) that the leg member 282d and the leg member 282e are provided is moved (displaced) in the rearward direction (depressed direction) with a side (upper side) that the cylindrical member 282b and the cylindrical member 282c are provided as an axis. That is, the holder 282 is made to be tilted (turned). When the side provided with the leg member 282d and the leg member 282e in the holder 282 is moved in the rearward direction, the end portions of the rear side of the leg member 282d and the leg member 282e are abutted (brought into contact) to the electronic circuit board 300, and therefore, a movement of the holder 282 in the rear in the side provided with the leg member 282d and the leg member 282e is regulated within a predetermined range. At this time, the holder 282 is supported by four points, the cylindrical member 282b, the cylindrical member 282c, the leg member 282d and the leg member 282e. That is, the holder 282 is supported by both of the side provided with the cylindrical member 282b and the cylindrical member 282c and the side (opposite side) provided with the leg member 282d and the leg member 282e. Therefore, a load that is applied to the side of the cylindrical member 282b and cylindrical member 282c is reduced, and accordingly, it is possible to prevent the pointing stick 28 from being damaged.

In addition, in this first embodiment, since the electronic circuit board 300 is arranged in of the contact portion of the pointing stick 28, when the pointing stick 28 is depressed by an unnecessarily strong force, the leg member 282d and the leg member 282e are abutted to the electronic circuit board 300; however, the leg member 282d and the leg member 282e may be abutted to a member(s) other than electronic circuit board 300 depending on the structure of the game apparatus 10 (input device 40). For example, in a case where (a part of) the rear side member 142 of the lower housing 14 is arranged in the rear side of the pointing stick 28, when the pointing stick 28 is depressed by an unnecessarily strong force, the leg member 282d and the leg member 282e are abutted to the rear side member 142.

Moreover, in this first embodiment, although the leg member 282d and the leg member 282e are used, only one leg member may be used as long as support of the holder 282 is possible. Moreover, three or more leg members may be provided. Moreover, instead of the leg member 282d and the leg member 282e, a wall may be provided so as to support a side opposite to the side provided with the cylindrical member 282b and the cylindrical member 282c with a side (line).

Furthermore, in this first embodiment, since the leg member 282d and the leg member 282e are provided, the holder 282 may be fixed at one point on a side opposite to the side that the leg member 282d and the leg member 282e are provided. In this case, for example, if the holder 282 is fixed to the lower housing 14 on a straight line or its near, which passes through the midpoint between the leg member 282*d* and the leg member 282*e* and perpendicular to a line segment connecting the leg member 282*d* and the leg member 282*e*, the pointing stick 28 can be supported with a plane of a triangular shape. Therefore, it is possible to consider that the pointing stick 28 can be stably supported regardless of a direction that the pointing stick 28 is depressed.

On the other hand, when the pointing stick 28 is not depressed, even if the lower housing 14 (the front side member 140 or/and the electronic circuit board 300 in FIG. 8) is bent (deformed), since the gap G1 is formed, the front side member 140 is not immediately brought into contact with an end portion of the holder 282. That is, the front side member 140 is hard to come into contact with the end portion of the holder 282, which a bend is easily propagated. Moreover, even if a bend of the front side member 140 propagates to the holder 282, since the gap G2 is formed between the leg members 282*d* and 282*e* and the electronic circuit board 300, the holder 282 can move in a form of plane, and therefore, the bend is absorbed to some extent. Therefore, it is possible to prevent, as much as possible, the resistance value of each of the distortion sensors 288*a*-288*d* from being changed as the lower housing 14 is bent. That is, it is possible to reduce a possibility that a signal is erroneously detected.

For example, as a cause by which the lower housing 14 is bent when the pointing stick 28 is not depressed, it is conceivable that the user strongly grasps the lower housing 14, that the user operates any one or two or more of the push buttons 26*a*-26*d*, or that the user performs a touch operation (contact input) to the touch panel 30 (in case of a touchpad is the same). The lower housing 14 may be bent through an action of one of these causes or by a combined action of two or more causes.

In addition, in this first embodiment, although the holder 282 is fixed to the lower housing 14 with a single side thereof, it does not need to be limited to this. As another example, the holder 282 may be fixed to the lower housing 14 with two sides including one side and another side adjacent (connected) thereto. Even in such a case, since the holder 282 is not fixed to the lower housing 14 in a plane manner, it is possible to prevent distortion due to the bend of the lower housing 14 from being detected by the distortion sensors 288*a*-288*d*. Moreover, when fixing the holder 282 to the lower housing 14 at adjacent two sides, instead of the leg member 282*d* and the leg member 282*e*, a single leg member that is arranged on the rear side of the holder 282 at a corner portion that two sides not fixed are connected to each other or its near, and is extended in the rearward direction may be provided. Even if it does in this way, when the pointing stick 28 is depressed, it is possible to support the pointing stick 28 with a plane of a triangular shape by the fixed two sides and a single leg member.

Moreover, in this first embodiment, although the holder 282 is fixed to the lower housing 14 at a single side of an outer periphery thereof, it does not need to be limited to this. As a further example, the holder 282 may be fixed to the lower housing 14 at two diagonal corner portions. In such a case, on a diagonal line (second diagonal line) intersecting a diagonal line (first diagonal line) connecting the corner portions at which the holder 282 is fixed to the lower housing 14, two leg members may be provided to be arranged so as to sandwich the first diagonal line. Even in such a case, while preventing distortion due to a bend of the lower housing 14 from being detected by the distortion sensors 288*a*-288*d*, a direction and size that the operating stick 284*c* is tilted by depressing the pointing stick 28 can be detected by the distortion sensors 288*a*-288*d*.

According to this first embodiment, since the holder to which the sensor board comprising the distortion sensor(s) is fixed is secured to the housing with a line or point(s), the sensor board is fixed also in a manner of a line or point, and therefore, even if the housing or/and the electronic circuit board is bent, it is possible to prevent the distortion due to such a bend from being detected by the distortion sensor as much as possible. That is, it is possible to reduce a possibility that a signal is erroneously detected.

Moreover, according to this first embodiment, since a portion where the holder comes into contact to the housing is the projecting portion that is provided on an inner side of the holder main body near the cap, even if the housing is bent when the pointing stick is not depressed, it is possible to prevent the housing from being brought into contact to the end portion of the holder 282 as much as possible, which a bend is easily propagated. Moreover, since the gap is formed between the leg members and the electronic circuit board in a side opposite to a side that the holder is fixed, even if the housing or/and the electronic circuit board is bent when the pointing stick is not depressed, a bend is absorbed to some extent by the gap. Thus, even if the housing is bent, it is possible to prevent the distortion due to the bend from being detected by the distortion sensor as much as possible.

Furthermore, in the first embodiment, since the leg member is provided on the holder, when the pointing stick is depressed by an unnecessarily strong force, a movement of the pointing stick in the rearward direction is regulated within a predetermined range, and therefore, the pointing stick is supported at both of the side that the pointing stick is fixed and the side that the leg members are provided, it is possible to prevent the pointing stick from being damaged.

Second Embodiment

Since a non-limiting example game apparatus 10 of the second embodiment is the same as the game apparatus 10 shown in the first embodiment except that a configuration of a part of pointing stick 28 differs, different contents will be described and duplicate description will be omitted.

In the above-described first embodiment, by providing the leg member 282*d* and the leg member 282*e* on the holder 282, when the pointing stick 28 is depressed by an unnecessarily strong force, the leg member 282*d* or/and the leg member 282*e* is brought into contact to the electronic circuit board 300, whereby a movement of the pointing stick 28 in the rearward direction is regulated within the predetermined range; however, a configuration regulating the movement should not be limited.

Figure 9:
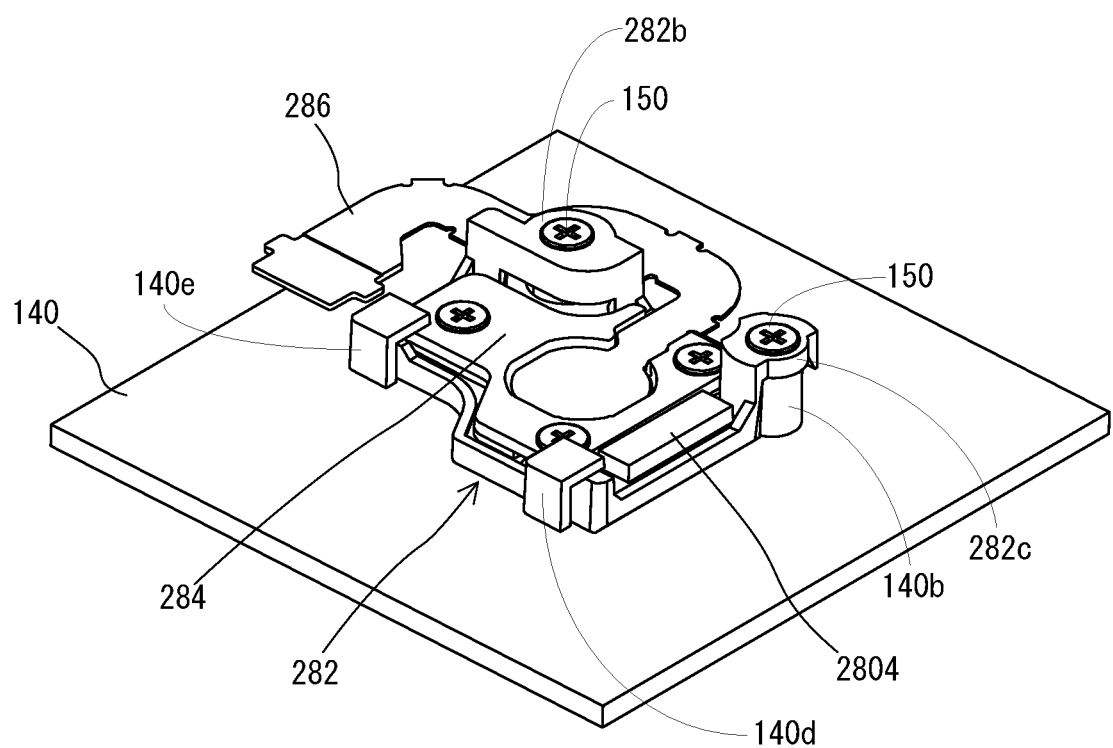
FIG. 9 is a perspective view showing a non-limiting example attaching state of a non-limiting example pointing stick of a game apparatus according to a second embodiment.
Figure 10:
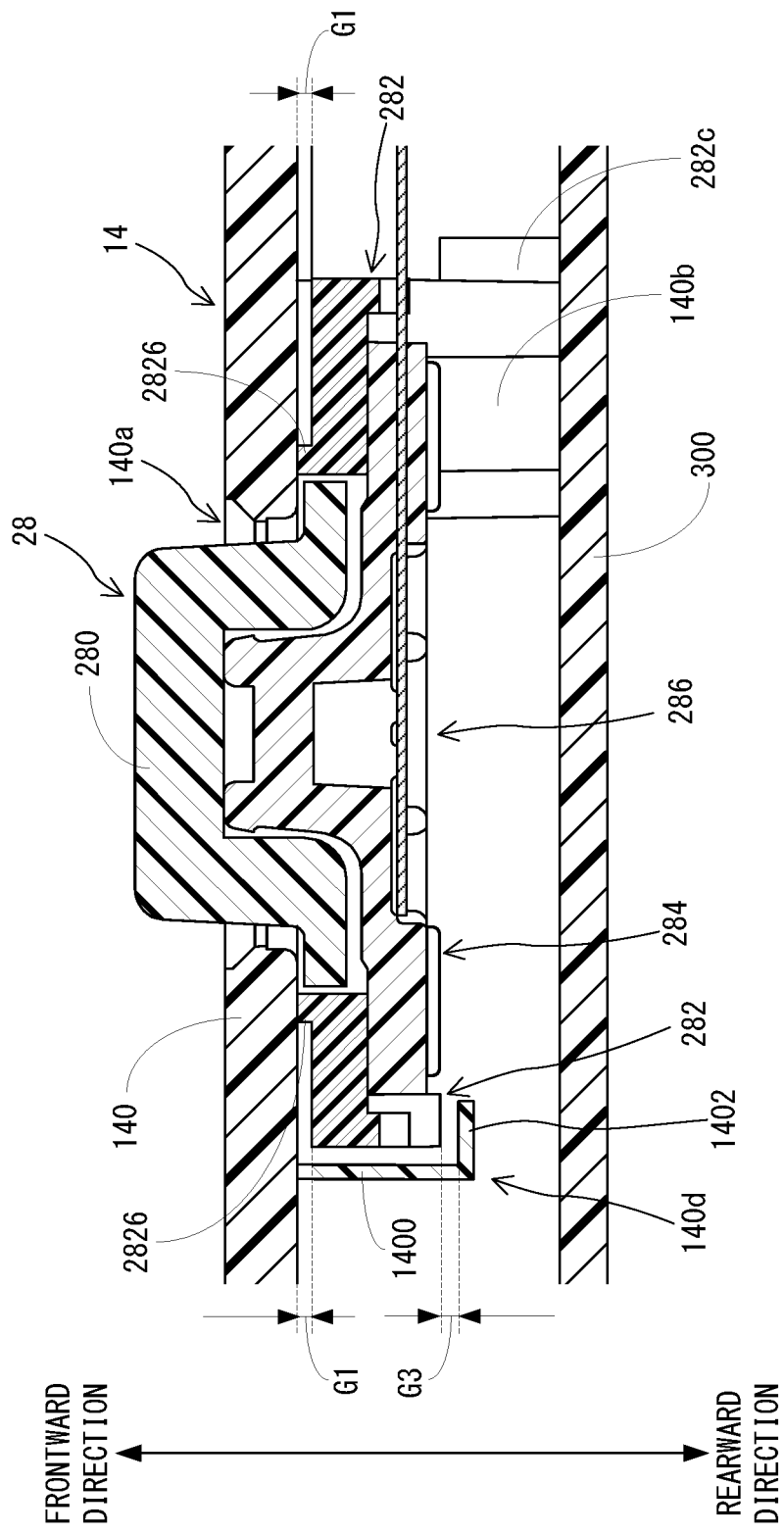
FIG. 10 is a cross-sectional view showing a part of a non-limiting example cross-section of the game apparatus according to the second embodiment.

As shown in FIG. 9 and FIG. 10, the leg member 282*d* and the leg member 282*e* of the holder 282 shown in the first embodiment may be omitted (eliminated), and L-letter shaped locking members 140*d* and 140*e* that are extended in the rearward direction may be provided in the rear side of the front side member(s) of the lower housing 14. As shown in FIG. 9 and FIG. 10, the locking member 140*d* and the locking member 140*e* are arranged so as to be engaged with the holder 282 in positions provided with the leg member 282*d* and the leg member 282*e*, respectively. More specifically, as shown in FIG. 10, the locking member 140*d* is constituted by a first member 1400 that is extended below (perpendicular to the front) in the rear side from the front side member 140 and a second member 1402 that is extended toward the holder 282 from an end portion (edge portion in the rear side) of the first member 1400. This is the same also about the locking member 140e. Therefore, when the pointing stick 28 is depressed, a side not provided with the cylindrical member 282b and the cylindrical member 282c of the holder 282 is moved in the rearward direction so as to engage with the second member(s) 1402 of the locking member 140d or/and the locking member 140e.

As shown in FIG. 10, when the pointing stick 28 is not depressed by an unnecessarily strong force, a gap G3 is formed in the rearward direction between the rear surface of the holder 282 and the locking member 140d (140e). For example, a width (size) of the gap G3 is the same as that of the gap G2 shown in FIG. 8 in the first embodiment.

Even in this case, a movement of the pointing stick 28 in the rearward direction at the time that the pointing stick 28 is depressed with an unnecessarily strong force can be regulated within a predetermined range.

In addition, since structure except the configuration for regulating a movement of the pointing stick 28 in the rearward direction is the same as the structure shown in the first embodiment, duplicate description is omitted here.

Also in the second embodiment, the same or similar advantages as those in the first embodiment can be expected.

Third Embodiment

Since a non-limiting example game apparatus 10 of the third embodiment is the same as the game apparatus 10 shown in the first embodiment except that a configuration of a part of pointing stick 28 differs, different contents will be described and duplicate description will be omitted.

Briefly describing, the holder 282 shown in the first embodiment is omitted (removed), and an operating body 284 to which a cap 280 is attached and a sensor board 286 is adhesively fixed is fixed to the lower housing 14.

FIG. 11 is a perspective view showing a non-limiting example state where a pointing stick 28 provided in the game apparatus 10 of the third embodiment is disassembled, when viewed obliquely rear. As shown in FIG. 11, the pointing stick 28 of the third embodiment includes the cap 280, the operating body 284 and the sensor board 286. The sensor board 286 is the same as the sensor board 286 shown in the first embodiment.

The cap 280 of the third embodiment is provided with protruding portion 280g and protruding portion 280h instead of the protruding portion 280e and the protruding portion 280f of the first embodiment. The protruding portion 280g is provided so as to further protrude outward from a part of the flange portion 280d. Similarly, the protruding portion 280h is provided so as to further protrude outward from another part of the flange portion 280d. A ring-like locking portion 2806 is provided in an end portion of the protruding portion 280g. Similarly, a ring-like locking portion 2808 is provided in an end portion of the protruding portion 280h.

In addition, the peripheral surface portion 280a, the top surface portion 280b, the opening portion 280c and the flange portion 280d are the same as those of the cap 280 of the first embodiment.

The operating body 284 of the third embodiment is substantially the same as the operating body 284 of the first embodiment, but a part of the base portion 284a is omitted (removed). As can be seen from comparison with FIG. 6, a portion that the hole 2840 is formed is removed.

In addition, the pedestal portion 284b and the operating stick 284c are the same as those of the operating body 284 of the first embodiment.

Figure 12A:
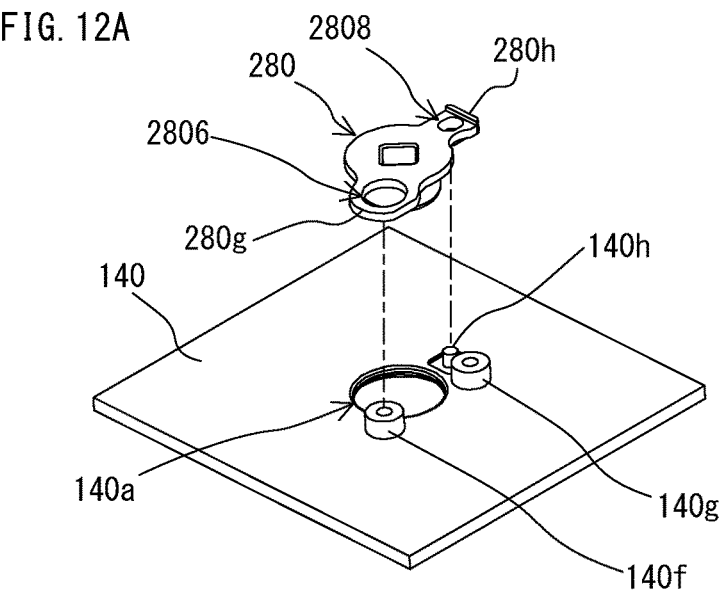
FIG. 12A is a perspective view showing a non-limiting example state before a cap is put on a front side member.
Figure 12B:
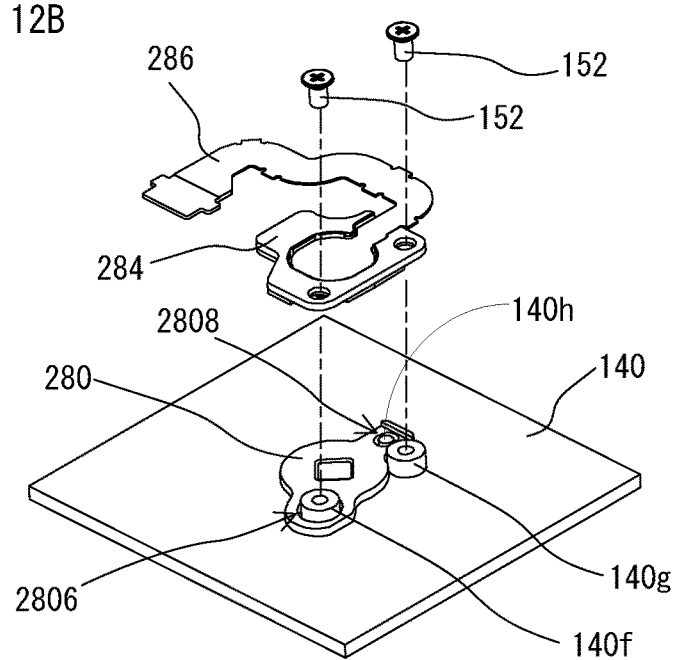
FIG. 12B is a perspective view showing a non-limiting example state before an operating body to which a sensor board is adhesively fixed is further put on in the front side member that the cap is put thereon.
Figure 12C:
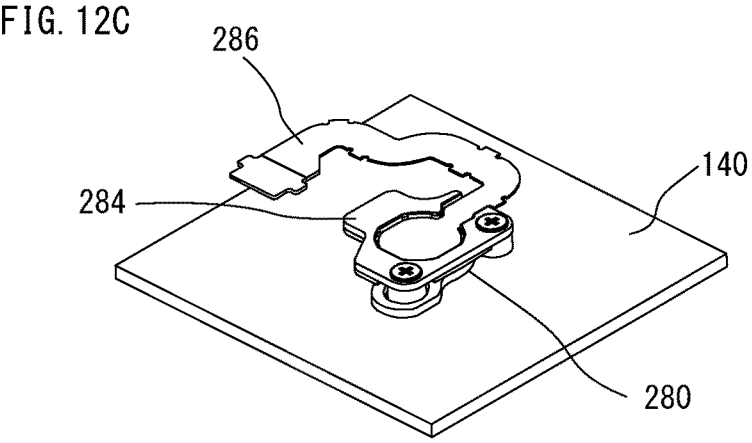
FIG. 12C is a perspective view showing a non-limiting example state where the operating body to which the sensor board is adhesively fixed is secured to the front side member in the state shown in FIG. 12B.

Here, using FIG. 12A-FIG. 12C, description is made on a method and mounting structure of attaching the pointing stick 28 shown in FIG. 11 to the lower housing 14. However, in FIG. 12A-FIG. 12C, only a part of the front side member 140 of the lower housing 14 is shown. Moreover, as shown in FIG. 12A-FIG. 12C, when attaching the pointing stick 28 to the lower housing 14, the cap 280 and the operating body 284 to which the sensor board 286 are fixed is attached from the rear side of the front side member 140. Therefore, a state viewed from the rear side is shown in each of FIG. 12A-FIG. 12C.

For example, as shown in FIG. 12A and FIG. 12B, the cap 280 is put on the front side member 140 so that the top surface portion 280b and a part of the peripheral surface portion 280a of the cap 280 are fit (inserted) into the hole 140a from the rear side of the front side member 140 of the lower housing 14, and a cylindrical member 140f that is provided in the rear side of the front side member 140 is fit (inserted) into the locking portion 2806, and a circular post (protruding portion) 140h that is provided in the rear side of the front side member 140 is fit (inserted) into the locking portion 2808.

Subsequently, as shown in FIG. 12B and FIG. 12C, the operating body 284 to which the sensor board 286 is adhered is fixed to the rear side of the front side member 140. In this case, the operating stick 284c is attached to the cap 280 from the opening portion 280c (see FIG. 13). Moreover, at this time, a direction of the operating body 284 is set so that the cylindrical member 140f is overlapped with a position of a hole 2842 of the operating body 284 and the cylindrical member 140g is overlapped with a position of a hole 2844 of the operating body 284. Then, as shown in FIG. 14C, the operating body 284 to which the sensor board 286 is adhered is fixed to the front side member 140 with the screw 152.

In addition, although the operating body 284 to which the sensor board 286 is adhered is fixed to the front side member 140 with the screw 152 in this third embodiment, adhesive fixation may be adopted.

As shown in FIG. 12A and FIG. 12B, the operating body 284 is fixed to the front side member 140 while a locking portion 2806 and a locking portion 2808 are passed through the circular post 140h and the cylindrical member 140c, respectively. Therefore, the locking portion 2806 is not separated from the cylindrical member 140f unless the screw 152 is separated. Moreover, since the locking portion 2808 is biased to the rear surface of the front side member 140 with the operating body 284, the same is hardly separated from the circular post 140h.

Moreover, the flange portion 280d is engaged with a peripheral edge portion in the rear side of the hole 140a formed in the front side member 140 of the lower housing 14.

Since the cap 280 is thus attached, the cap 280 is prevented from being separated from the lower housing 14 (front side member 140), and the cap 280 is prevented from coming out of the operating stick 284c.

FIG. 13 is a sectional view showing a part of a non-limiting example cross-section of the game apparatus 10 of the third embodiment. Also in FIG. 13, a case where the game apparatus 10 is cut in the same position as VIII-VIII cross-section shown in FIG. 1 is shown. Specifically, FIG. 13 shows a non-limiting example portion that the pointing stick 28 is attached to the lower housing 14. However, in FIG. 13, components other than the pointing stick 28, such as the second LCD 22 arranged behind (leftward direction in FIGS. 1A and 1B) the pointing stick 28, etc. are omitted. Moreover, components that are arranged in the rear side from a member (here, the electronic circuit board 300) that is provided in the rearward direction of the pointing stick 28 and the rear side member 142 constituting the lower housing 14 are also omitted.

As shown also in FIG. 13, the pointing stick 28 is arranged in the lower housing 14 so that a part of the cap 280 (the top surface portion 280b and an approximately upper half of the peripheral surface portion 280a) is exposed from the front surface of the lower housing 14 through the hole 140a formed in the front side member 140 of the lower housing 14. The cap 280 is attached so as to cover the operating stick 284c of the operating body 284. However, the operating body 284 is fixed to the front side member 140.

As described above, the operating body 284 is fixed to the lower housing 14 in two points that the hole 2842 and the hole 2844 are formed. That is, the operating body 284 is fixed, with a line (a line segment connecting the above-described two points), to the lower housing 14 on a single side of a side that is formed with the hole 2842 and the hole 2844. Moreover, the operating body 284 may be fixed at further arbitrary one point or two or more points between the hole 2842 and the hole 2844. However, when it can be considered that the operating body 284 is being fixed to the lower housing 14 in a line, the operating body 284 may be fixed to the lower housing 14 at three or more points including one point or two or more points not on a straight line connecting two points that the hole 2842 and the hole 2844 are formed, respectively. That is, even if a shape of a surface that is formed by connecting the fixed points is a polygonal shape such as a triangle, a shape of the surface may be any shape as long as it does not hinder the operating body 284 to rotate (tilt), such as an elongated triangle or an elongated quadrangle shape (bar shape).

In this third embodiment, the operating body 284 is supported at a side that the hole 2842 and the hole 2844 are formed, and when depressing the pointing stick 28 (cap 280), usually, a direction and size that the operating stick 284c is tilted are detected by the distortion sensors 288a-288d.

Moreover, since the operating body 284 is fixed to the front side member 140 in the portion that the hole 2842 and the hole 2844 are formed, when depressing the pointing stick 28 by an unnecessarily strong force, a side (right side: front side in FIG. 13) opposite to a side that the hole 2842 and the hole 2844 are formed is moved in the rearward direction (depressed direction) with a side (left side: depth side in FIG. 13) that the hole 2842 and the hole 2844 are formed as an axis.

Therefore, also in the third embodiment, as shown in the first embodiment, there may be provided with one or two or more leg members extended in the rearward direction in the side opposite to the side that the hole 2842 and the hole 2844 are formed. However, a gap is formed between an end portion of the leg member at the rear side and the electronic circuit board 300 except a case where the pointing stick 28 is depressed with an unnecessarily strong force or a case where the lower housing 14 is bent.

Thus, if providing one or two or more leg members on the operating body 284, when the operating body 284 is tilted (turned) and thus a side provided with one or two or more leg members is moved in the rearward direction, end portions of the rear side of the one or two or more leg members are abutted (brought into contact) to the electronic circuit board 300, and therefore, a movement of the operating body 284 in the rearward direction in the side provided with the one or two or more leg members is regulated within a predetermined range. At this time, the operating body 284 is supported by three or more points by one or two or more leg members in addition to two points that the hole 2842 and the hole 2844 are formed, respectively. That is, the operating body 284 is supported by both of the side formed with the hole 2842 and the hole 2844 and the side (opposite side) provided with the one or two or more the leg members. Therefore, a load that is applied to the side formed with the hole 2842 and the hole 2844 is reduced, and accordingly, it is possible to prevent the pointing stick 28 from being damaged.

In addition, in place of providing one or two or more leg members, one or two or more L-letter shaped locking members that are extended in the rearward direction may be provided in the rear side of the front side member of the lower housing 14, as shown in the second embodiment.

Moreover, although the operating body 284 is fixed to the lower housing 14 in two points that the hole 2842 and the hole 2844 are formed in the third embodiment, positions of the two points to be fixed need not be limited. As an example, by forming two holes in an opposite side to the side formed with the hole 2842 and the hole 2844 instead of the hole 2842 and the hole 2844 of the operating body 284, the operating body 284 may be fixed to the lower housing 14 in two points of the opposite side.

According to this third embodiment, since the sensor board provided with the distortion sensors is fixed to the housing in a line, even if the housing is bent, the sensor board is tilted or turned in a plane, whereby the distortion due to such a bend can be prevented from being detected by the distortion sensor as much as possible. That is, it is possible to reduce a possibility that a signal is erroneously detected.

Moreover, although each of above-described embodiments is described for the game apparatus 10 provided with the input device 40 as an example of an information processing apparatus, it does not need to be limited to this. For example, the input device 40 and an information processing apparatus such as a stationary type game apparatus or a general-purpose computer may be separately provided. In such a case, the input device 40 may be wire-connected to the information processing apparatus. Therefore, the input device 40 is provided with an interface for performing wire-communication with the information processing apparatus in place with the communication module 58 or separately from the communication module 58.

Furthermore, the configurations of the specific game apparatuses (information processing apparatuses) or the input devices described in the above-described embodiments are mere examples and can be appropriately changed according to the actual products.

Although certain example, methods, devices and apparatuses have been described herein, it is to be understood that the appended claims are not to be limited to the methods, devices and apparatuses disclosed, but on the contrary, are intended to cover various modifications and equivalent arrangements included within the spirit and scope of the appended claims.

What is claimed is:

1. An input device, comprising:
   a housing;
   a protrusion; and
   an input detector configured to detect input based on operation of the protrusion, wherein
   the input detector is fixed to the housing at one or more points disposed to provide a tilt axis for allowing tilting movement of the input detector in response to a bending of the housing.

2. The input device according to claim 1, further comprising a holding member configured to hold the input detector, the input detector being fixed to the housing via the holding member.

3. The input device according to claim 1, wherein the input detector is configured to detect distortion according to operation of the protrusion.

4. The input device according to claim 2, wherein the holding member is fixed in a linear manner to the housing.

5. The input device according to claim 4, wherein the holding member is fixed in a linear manner to the housing at one side or two adjacent sides.

6. The input device according to claim 4, wherein the holding member is fixed to the housing at two fixing portions.

7. The input device according to claim 3, wherein the holding member is fixed to the housing at a single fixing portion.

8. The input device according to claim 2, wherein the protrusion comprises an elastic material and includes a portion sandwiched between the input detector and the holding member.

9. The input device according to claim 2, wherein the holding member further comprises a leg member configured to regulate a side not fixed to the housing of the holding portion from being displaced due to operation of the protrusion within a predetermined range.

10. The input device according to claim 9, wherein the leg member extends in a direction perpendicular to a first surface of the housing in the holding member, and the leg member is provided with having a gap from a further member, and is brought into contact to the further member when the holding member is inclined due to operation to the protrusion, thereby to support the holding member.

11. The input device according to claim 9, wherein the leg member includes a first portion extending from the housing in a direction perpendicular to a first surface of the housing and a second portion extending from an end of the first portion toward the holding member, and the leg member is provided with having a gap between the holding member and the second portion, and the holding member is configured to be brought into contact to the second portion when the holding member is inclined due to operation to the protrusion, thereby to support the holding member.

12. The input device according to claim 2, wherein a detector including the input detector is fixed to the holding member at three or more points.

13. The input device according to claim 2, wherein the holding member is fixed to a first surface of the housing.

14. The input device according to claim 2, wherein the holding member includes a protruding portion provided around the protrusion, and the protruding portion is configured to be brought into contact with the housing.

15. The input device according to claim 1, wherein the protrusion is provided on a grip of the housing.

16. The input device according to claim 1, wherein the housing further comprises a depressible input, and the protrusion is provided adjacent to the depressible input.

17. The input device according to claim 16, wherein the depressible input is operable for performing touch input.

18. An information processing apparatus, comprising the input device recited in the claim 1.

19. A method for manufacturing an input device comprising a housing, a protrusion, and an input detector configured to detect input based on operation of the protrusion, the method comprising:
(a) arranging the protrusion on a front side of the housing; and
(b) connecting the input detector to the protrusion for enabling detecting of input based on operation of the protrusion, and fixing the input detector to the housing in a rear side of the housing at one or more points disposed to provide a tilt axis for allowing tilting movement of the input detector in response to a bending of the housing.

20. A method for manufacturing an input device comprising a housing, a protrusion, an input detector configured to detect input based on operation of the protrusion, and a holding member configured to hold the input detector, the method comprising:
(a) arranging the protrusion on a front side of the housing;
(b) connecting the input detector to the protrusion for enabling detecting of input based on operation of the protrusion, and fixing the input detector to the holding member; and
(c) fixing the holding member to the housing in a rear side of the housing at one or more points disposed to provide a tilt axis for allowing tilting movement of the input detector in response to a bending of the housing.

21. The input device according to claim 1, wherein the input detector is fixed to the housing at one point.

22. The input device according to claim 1, wherein the input detector is fixed to the housing at a two points.

23. The input device according to claim 1, wherein the input detector is fixed to the housing at three or more co-linear points.

24. The input device according to claim 1, wherein the protrusion comprises an operating stick or a cap for an operating stick.

25. The input device according to claim 1, wherein the input detector detects a direction and a magnitude of a tilt of the operating stick based on the operation of the protrusion.

26. A game controller comprising an input device according to claim 1.

27. A game system comprising the game controller according to claim 26.

* * * * *